US008698330B2

(12) United States Patent
    Taketomi

(10) Patent No.: US 8,698,330 B2
(45) Date of Patent: Apr. 15, 2014

(54) PORTABLE INVERTER POWER GENERATION APPARATUS WITH RESONANCE SPEED CONTROL

(75) Inventor: Kouichi Taketomi, Shizuoka (JP)

(73) Assignee: Yamaha Motor Power Products Kabushiki Kaisha, Shizuoka (JP)

( * ) Notice: Subject to any disclaimer, the term of this patent is extended or adjusted under 35 U.S.C. 154(b) by 583 days.

(21) Appl. No.: 12/732,341

(22) Filed: Mar. 26, 2010

(65) Prior Publication Data

US 2010/0244460 A1    Sep. 30, 2010

(30) Foreign Application Priority Data

Mar. 27, 2009 (JP) ................................. 2009-078075

(51) Int. Cl.
    *F02D 29/06*    (2006.01)
(52) U.S. Cl.
    USPC .............................. 290/40 C; 322/44; 322/28
(58) Field of Classification Search
    USPC ........................................................ 290/1 A
    See application file for complete search history.

(56) References Cited

U.S. PATENT DOCUMENTS

| | | | | |
|---|---|---|---|---|
| 3,855,515 | A | * | 12/1974 | Hutchins, Jr. ................. 318/685 |
| 4,918,592 | A | * | 4/1990 | Shimizu ........................... 363/50 |
| 6,034,511 | A | * | 3/2000 | Scott et al. ....................... 322/46 |
| 6,278,195 | B1 | * | 8/2001 | Yamaguchi et al. ......... 290/40 A |
| 6,534,958 | B1 | * | 3/2003 | Graber et al. .................... 322/11 |
| 7,652,900 | B2 | * | 1/2010 | Fukaya et al. ................. 363/132 |
| 7,884,581 | B2 | * | 2/2011 | Markunas et al. .............. 322/44 |
| 2004/0008009 | A1 | | 1/2004 | Fukaya |
| 2005/0029992 | A1 | | 2/2005 | Endou et al. |

(Continued)

FOREIGN PATENT DOCUMENTS

| | | |
|---|---|---|
| CN | 101342902 A | 1/2009 |
| EP | 1 689 060 A2 | 8/2006 |

(Continued)

*Primary Examiner* — Tulsidas C Patel
*Assistant Examiner* — S. Mikailoff
(74) *Attorney, Agent, or Firm* — Keating & Bennett, LLP

(57) ABSTRACT

In a portable inverter power generation apparatus, a rectifying circuit converts AC electric power generated by an electric generator into DC electric power, and an inverter circuit converts the DC electric power into AC electric power. A current sensor detects an AC output current from the inverter circuit. In a first case where the AC output current detected by the current sensor increases from a value lower than a first value to a value higher than the first value, a computer sets a target rotational speed to a value lower than a resonance rotational speed at which an engine resonates until the AC output current detected by the current sensor increases to a second value higher than the first value, and sets the target rotational speed to a value higher than the resonance rotational speed when the detected AC output current increases to the second value. In a second case where the AC output current detected by the current sensor decreases from a value higher than the second value to a value lower than the second value, the computer unit sets the target rotational speed to a value higher than the resonance rotational speed until the AC output current detected by the current sensor decreases to the first value, and sets the target rotational speed to a value lower than the resonance rotational speed when the detected AC output current decreases to the first value.

10 Claims, 9 Drawing Sheets

(56) References Cited

U.S. PATENT DOCUMENTS

| | | | |
|---|---|---|---|
| 2006/0157987 A1* | 7/2006 | Albrecht | 290/1 A |
| 2006/0193158 A1 | 8/2006 | Fukaya et al. | |
| 2006/0289214 A1* | 12/2006 | Katsuhiro et al. | 180/65.4 |
| 2007/0249461 A1* | 10/2007 | Tsuji et al. | 477/3 |
| 2009/0237019 A1* | 9/2009 | Yamakawa et al. | 318/400.09 |
| 2009/0308145 A1* | 12/2009 | Suzuki | 73/114.04 |
| 2010/0113213 A1* | 5/2010 | Oba et al. | 477/5 |

FOREIGN PATENT DOCUMENTS

| | | |
|---|---|---|
| JP | 09-032596 A | 2/1997 |
| JP | 11-103501 A | 4/1999 |
| JP | 2003-284397 A | 10/2003 |
| JP | 2005-201297 A | 7/2005 |
| JP | 2006-217780 A | 8/2006 |
| JP | 2008-169796 A | 7/2008 |
| JP | 2009-35121 A | 2/2009 |

* cited by examiner

PORTABLE INVERTER POWER GENERATION APPARATUS WITH RESONANCE SPEED CONTROL

BACKGROUND OF THE INVENTION

1. Field of the Invention

The present invention relates to a portable inverter power generation apparatus that converts AC electric power into DC electric power, converts the DC electric power obtained by the conversion into AC electric power, and outputs the AC electric power to an exterior.

2. Description of the Background Art

Power supplies for electric tools or lighting fittings used outdoors such as building sites, construction sites, or street stalls include portable inverter power generation apparatuses. In the portable inverter power generation apparatus, a rectifying circuit rectifies AC electric power generated from an electric generator by the rotation of an engine to convert the AC electric power into DC electric power, and an inverter circuit converts the DC electric power obtained by the conversion into AC electric power and outputs the AC electric power to the exterior.

In this portable inverter power generation apparatus, the rotational speed of the engine is increased when a load current increases, while being decreased when the load current decreases. The load current corresponds to an AC output current of the electric generator.

JP 2003-284397 A and JP 2006-217780 A, for example, discuss detecting, in an inverter power generation apparatus, an AC output current output from an inverter circuit to the exterior using a current sensor, to determine a target rotational speed of an engine based on the detected AC output current and to control the rotational speed of the engine to be the determined target rotational speed. Thus, the rotational speed of the engine can be controlled so that a suitable current can be supplied to a load according to the state of the load.

On the other hand, JP 11-103501 A discusses a control device for an electric generator used in a hybrid vehicle. A method and an operation for controlling the electric generator used in the hybrid vehicle respectively differ from a method and an operation for controlling the portable inverter power generation apparatus. In the control device discussed in JP 11-103501A, required generated electric power of the electric generator is operated based on traveling conditions of the vehicle and an amount of charge of a battery. The rotational speed of an engine for driving the electric generator required to generate the required generated electric power (required rotational speed) is acquired from map data, and the rotational speed of the engine is set based on the required rotational speed. When the required rotational speed is within a resonance region between the engine and the electric generator, the rotational speed of the engine is set outside the resonance region. This results in prevention of noise caused by resonance between the engine for driving the electric generator and the electric generator.

In the electric generator used in the hybrid vehicle, the control device not only sets the target rotational speed of the engine in response to an AC output current of the electric generator but controls the rotational speed of the engine based on the traveling conditions of the vehicle and the amount of charge of the battery. The rotational speed of a multiple cylinder engine used in the hybrid vehicle smoothly changes. Therefore, the AC output current of the electric generator hardly severely increases and decreases in a short period of time.

On the other hand, the AC output current of the portable inverter power generation apparatus may severely increase and decrease in a short period of time depending on the state of a load. Since no battery is generally provided in the portable inverter power generation apparatus, a change in a load current is not mitigated by charging and discharging the battery. When a controlling method similar to that for the electric generator used in the hybrid vehicle is applied to the portable inverter power generation apparatus for setting the rotational speed of the engine based on the AC output current of the electric generator, therefore, a great burden may be imposed on the engine. In the portable inverter power generation apparatus, therefore, it is desired that the resonance of the engine is suppressed without imposing the great burden on the engine.

SUMMARY OF THE INVENTION

In order to overcome the problems described above, preferred embodiments of the present invention provide a portable inverter power generation apparatus in which the generation of noise is prevented without imposing a great burden on an engine.

According to a preferred embodiment of the present invention, a portable inverter power generation apparatus includes an engine, an electric generator arranged to generate AC electric power by the rotation of the engine, a rectifying circuit arranged to convert the AC electric power generated by the electric generator into DC electric power, an inverter circuit arranged to convert the DC electric power obtained by the conversion into AC electric power, a current detector arranged to detect an AC output current from the inverter circuit, and a controller arranged and programmed to set a target rotational speed of the engine in response to the AC output current detected by the current detector, and control the rotational speed of the engine according to the set target rotational speed. In a first case where the AC output current detected by the current detector increases from a value lower than a predetermined first value to a value higher than the first value, the controller sets the target rotational speed to a value lower than a resonance rotational speed at which the engine resonates until the AC output current detected by the current detector increases to a second value higher than the first value, and sets the target rotational speed to a value higher than the resonance rotational speed when the detected AC output current increases to the second value. In a second case where the AC output current detected by the current detector decreases from a value higher than the second value to a value lower than the second value, the controller sets the target rotational speed to a value higher than the resonance rotational speed until the AC output current detected by the current detector decreases to the first value, and sets the target rotational speed to a value lower than the resonance rotational speed when the detected AC output current decreases to the first value.

In the portable inverter power generation apparatus, when the engine rotates, the electric generator generates the AC electric power. The rectifying circuit converts the generated AC electric power into the DC electric power. The inverter circuit converts the DC electric power obtained by the conversion into the AC electric power. The current detector detects the AC output current from the inverter circuit. The controller sets the target rotational speed of the engine in response to the AC output current, to control the rotational speed of the engine according to the set target rotational speed.

In the first case, the target rotational speed is set to the value lower than the resonance rotational speed until the AC output current detected by the current detector increases to the second value. The difference between the set target rotational speed and the resonance rotational speed is large. The target rotational speed is set to the value higher than the resonance rotational speed when the AC output current detected by the current detector increases to the second value. The difference between the set target rotational speed and the resonance rotational speed is large. In the second case, the target rotational speed is set to the value higher than the resonance rotational speed until the AC output current detected by the current detector decreases to the first value lower than the second value. The difference between the set target rotational speed and the resonance rotational speed is large. The target rotational speed is set to the value lower than the resonance rotational speed when the AC output current detected by the current detector decreases to the first value. The difference between the set target rotational speed and the resonance rotational speed is large.

Thus, a period of time required for the engine to rotate at the resonance rotational speed is shortened when the rotational speed of the engine increases and decreases. Therefore, the vibration of the engine caused by the resonance thereof is prevented.

When the AC output current repeatedly increases and decreases in the vicinity of the second value depending on the state of the load, the target rotational speed is not repeatedly switched to the value lower than the resonance rotational speed and the value higher than the resonance rotational speed. Similarly, when the AC output current repeatedly decreases and increases in the vicinity of the first value depending on the state of the load, the target rotational speed is not repeatedly switched to the value higher than the resonance rotational speed and the value lower than the resonance rotational speed. This avoids the rotational speed of the engine suddenly changing repeatedly in a short period of time.

This results in the prevention of the generation of noise without imposing a great burden on the engine.

The controller may set the target rotational speed based on the property of the target rotational speed increasing as the AC output current increases within a range of the AC output current between the first value and the second value in the first case.

Thus, in the range of the AC output current between the first value and the second value in the first case, the higher the AC output current is, the higher the rotational speed of the engine becomes, and the lower the AC output current is, the lower the rotational speed of the engine becomes. This enables the load to be efficiently driven at a suitable current.

The controller may set the target rotational speed based on the property of the target rotational speed decreasing as the AC output current decreases within a range of the AC output current between the first value and the second value in the second case, and the absolute value of the slope of the property in the second case may be less than the absolute value of the slope of the property in the first case.

Thus, when the AC output current approaches the first value in the second case, the difference between the target rotational speed and the resonance rotational speed is sufficiently ensured. Therefore, a period of time required for the engine to rotate at the resonance rotational speed is reliably shortened. This results in reliable prevention of the vibration of the engine caused by the resonance thereof.

The controller may set the target rotational speed to a predetermined value within the range between the first value and the second value in the second case.

Thus, the target rotational speed is prevented from approaching the resonance rotational speed as the AC output current decreases from the second value to the first value in the second case. Therefore, the period of time required for the engine to rotate at the resonance rotational speed is reliably shortened. This results in reliable prevention of the vibration of the engine caused by the resonance thereof. A burden on the processing of the controller is reduced when the AC output current decreases from the second value to the first value.

The controller may set the absolute value of an amount of change in the target rotational speed when the detected AC output current decreases to the second value higher than the absolute value of an amount of change in the target rotational speed when the detected AC output current increases to the first value.

Thus, the difference between the target rotational speed and the resonance rotational speed is sufficiently ensured when the AC output current approaches the first value in the second case. Therefore, the period of time required for the engine to rotate at the resonance rotational speed is reliably shortened. This results in reliable prevention of the vibration of the engine caused by the resonance thereof.

The resonance rotational speed may comprise a plurality of resonance rotational speeds, the first value may comprise a plurality of first values corresponding to the plurality of resonance rotational speeds, the second value may comprise a plurality of second values corresponding to the plurality of resonance rotational speeds, each of the plurality of second values may be more than the corresponding first value, and the controller may set, until the AC output current detected by the current detector increases to each of the second values in the first case, the target rotational speed to a value lower than the corresponding resonance rotational speed, and set, when the detected AC output current increases to the second value, the target rotational speed to a value higher than the resonance rotational speed, and may set, until the AC output current detected by the current detector decreases to each of the first values in the second case, the target rotational speed to a value higher than the corresponding resonance rotational speed, and set, when the detected AC output current decreases to the first value, the target rotational speed to a value lower than resonance rotational speed.

In this case, even when the rotational speed of the engine changes over a wide range according to the change in the AC output current, the generation of the vibration of the engine caused by the resonance thereof at the plurality of resonance rotational speeds is reliably prevented. This results in the prevention of the generation of noise without imposing the great burden on the engine.

The controller may include a processor that sets the target rotational speed in response to the AC output current detected by the current detector, and an engine rotational speed adjuster configured to control the rotational speed of the engine according to the target rotational speed set by the processor.

In this case, the target rotational speed can be easily changed by changing the processing of the processor.

The processor may set the target rotational speed of the engine based on a previously stored relationship between the AC output current and the target rotational speed.

In this case, the target rotational speed of the engine can be easily changed by changing the relationship between the AC output current and the target rotational speed.

The controller may be selectively switchable to first and second modes. In the first mode, the controller may set, until the AC output current detected by the current detector increases to the second value in the first case, the target rotational speed to a value lower than the resonance rotational speed, and set, when the detected AC output current increases to the second value, the target rotational speed to a value higher than the resonance rotational speed, and may set, until the AC output current detected by the current detector decreases to the first value in the second case, the target rotational speed to a value higher than the resonance rotational speed, and set, when the detected AC output current decreases to the first value, the target rotational speed to a value lower than the resonance rotational speed. In the second mode, the controller may set, when the AC output current detected by the current detector is not more than a third value higher than the second value, the target rotational speed to a predetermined value higher than the resonance rotational speed.

In this case, in the first mode, the generation of the vibration of the engine caused by the resonance thereof is prevented without imposing the great burden on the engine while the rotational speed of the engine changes properly and efficiently depending on the state of the load. This results in improvement in the fuel consumption of the portable inverter power generation apparatus while resulting in prevention of the generation of noise caused by the resonance of the engine. In the second mode, the engine rotates at the predetermined rotational speed higher than the resonance rotational speed, so that the generation of noise is prevented and the rotation of the engine is stabilized.

The operations performed by the controller described in the preceding paragraphs correspond to the first mode.

The engine may be a single-cylinder four-cycle engine, for example. In this case, the rotational speed can be smoothly changed over a wide range. This enables the AC output current to be changed over a wide range according to the state of the load. The single-cylinder four-cycle engine is compact and lightweight. Therefore, the portable inverter power generation apparatus can be made compact and lightweight.

Other features, elements, characteristics, and advantages of the present invention will become more apparent from the following description of preferred embodiments of the present invention with reference to the attached drawings.

DETAILED DESCRIPTION OF THE PREFERRED EMBODIMENTS

Figure 1:
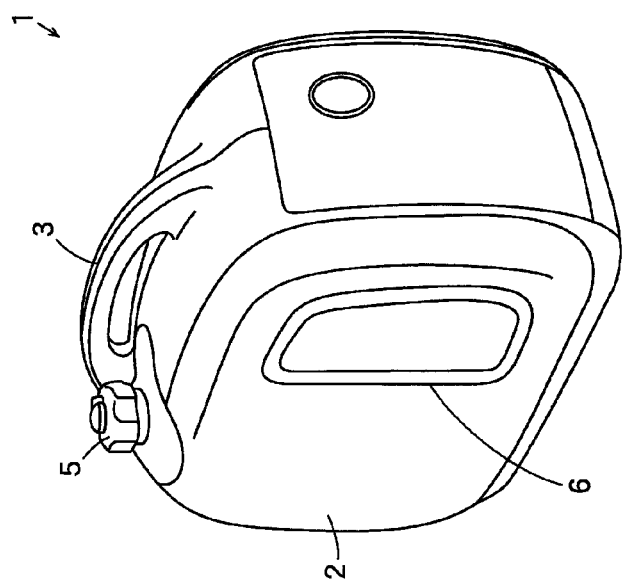
FIG. 1 is an external perspective view of a portable inverter power generation apparatus according to a preferred embodiment of the present invention.
Figure 2:
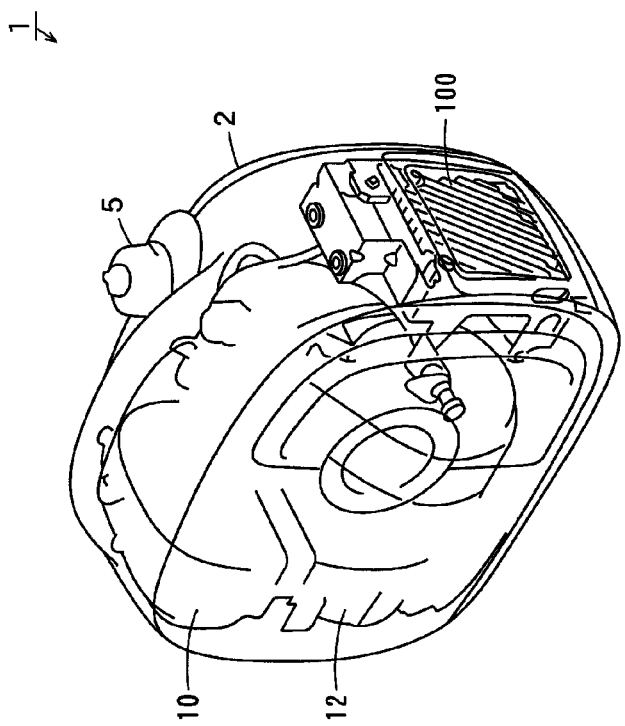
FIG. 2 is a see-through perspective view of the portable inverter power generation apparatus illustrated in FIG. 1.
Figure 3:
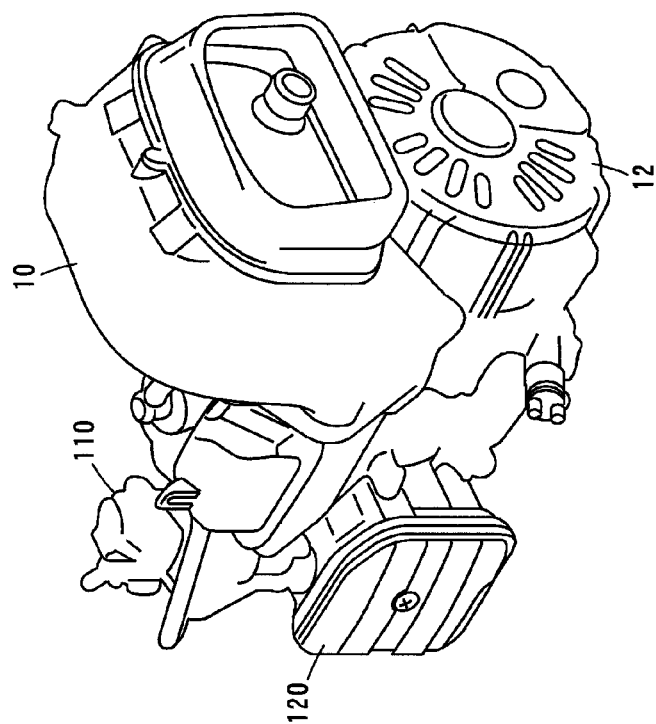
FIG. 3 is a perspective view mainly of an engine and an electric generator in the portable inverter power generation apparatus illustrated in FIG. 1.

Preferred embodiments of the present invention will be described below with reference to the drawings. FIG. 1 is an external perspective view of a portable inverter power generation apparatus according to a preferred embodiment of the present invention. FIG. 2 is a see-through perspective view of the portable inverter power generation apparatus illustrated in FIG. 1. FIG. 3 is a perspective view mainly of an engine and an electric generator in the portable inverter power generation apparatus illustrated in FIG. 1.

As illustrated in FIG. 1, a portable inverter power generation apparatus 1 includes a casing 2. A handle 3 and a fuel supply lid 5 are provided at the top of the casing 2. A switch panel 6 is provided on a side surface of the casing 2.

As illustrated in FIG. 2, the casing 2 preferably includes an engine 10, an electric generator 12, a control unit 100, and so on. As illustrated in FIG. 3, the electric generator 12 is provided at the bottom of the engine 10. The engine 10 is provided with a carburetor 110, an air cleaner 120, and so on. The engine 10 is an internal combustion engine driven by fuel such as gasoline or biofuel. In the present preferred embodiment, the engine 10 preferably is a single-cylinder four-cycle engine, for example. This enables the rotational speed of the engine 10 to smoothly change over a wide range. The single-cylinder four-cycle engine is compact and lightweight. The engine 10 is not limited to the single-cylinder four-cycle engine. For example, a multiple cylinder four-cycle engine or a two-cycle engine may be used as the engine 10.

A user can easily carry the portable inverter power generation apparatus 1 by holding the handle 3.

Figure 4:
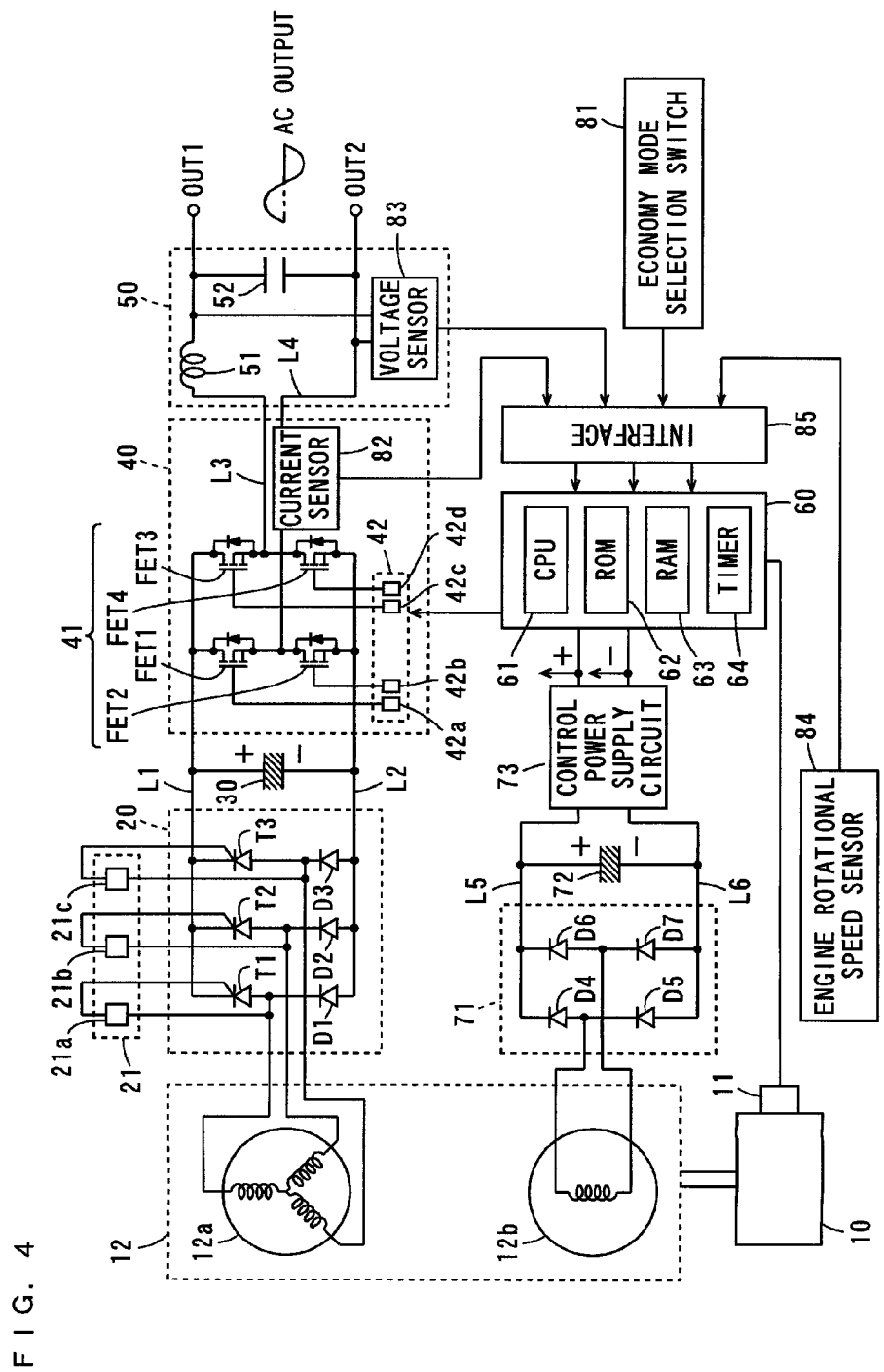
FIG. 4 is a circuit diagram of the portable inverter power generation apparatus according to a preferred embodiment of the present invention.

FIG. 4 is a circuit diagram of the portable inverter power generation apparatus according to the present preferred embodiment of the present invention. The portable inverter power generation apparatus (hereinafter abbreviated as inverter power generation apparatus) includes the engine 10. The engine 10 includes an opening adjuster 11. The opening adjuster 11 preferably includes a step motor, for example, and adjusts the opening of a throttle valve to change and control the rotational speed N of the engine 10.

The electric generator 12 is connected to an output rotating shaft of the engine 10 and a rotating shaft connected thereto. The electric generator 12 includes a plurality of magnets (not illustrated) on the rotor side, and a three-phase winding 12a and a single-phase winding 12b on the stator side. The plurality of magnets is arranged around the output rotating shaft of the engine 10 and the rotating shaft connected thereto. The three-phase winding 12a and the single-phase winding 12b on the stator side are respectively arranged at positions intersecting a magnetic flux formed of the plurality of magnets. The three-phase winding 12a constitutes the electric generator according to a preferred embodiment of the present invention, and generates a three-phase AC voltage by the rotation of the engine 10. The single-phase winding 12b generates a single-phase AC voltage by the rotation of the engine 10, and supplies DC electric power to various control circuits to control operations of the inverter power generation apparatus.

A full-wave rectifying circuit 20, a smoothing circuit 30, an inverter circuit 40, and an output circuit 50 are connected in this order to the three-phase winding 12a. The full-wave rectifying circuit 20 includes a three-phase bridge circuit including diodes D1, D2, and D3 and thyristors T1, T2, and T3. The full-wave rectifying circuit 20 converts a three-phase AC current output from the three-phase winding 12a into a DC current using full-wave rectification, and supplies the DC current obtained by the conversion to DC power supply lines L1 and L2. Thus, a DC voltage is output to the DC power supply lines L1 and L2. A voltage stabilizing circuit 21 is connected to the full-wave rectifying circuit 20.

The voltage stabilizing circuit 21 includes gate control circuits 21a, 21b, and 21c arranged to respectively control conduction of the thyristors T1, T2, and T3. The voltage stabilizing circuit 21 stabilizes the DC voltage by controlling timing of outputting the DC current output from the full-wave rectifying circuit 20 so that the DC current from the full-wave rectifying circuit 20 changes as little as possible depending on the rotational speed N of the engine 10. When the change in the DC voltage is not a problem, the voltage stabilizing circuit 21 may not be provided. In this case, diodes are respectively provided in place of the thyristors T1, T2, and T3.

The smoothing circuit 30 includes an electrolytic capacitor connected between the DC power supply lines L1 and L2, and smoothes the DC voltage output from the full-wave rectifying circuit 20. The inverter circuit 40 includes a switching circuit 41 and a pulse width modulation control circuit 42 (hereinafter merely referred to as a PWM controller 42). The inverter circuit 40 converts DC electric power on the DC power supply lines L1 and L2 into AC electric power (e.g., AC electric power having a frequency of 50 Hz or 60 Hz and having an effective voltage of 100 volts, 120 volts, or 230 volts), and outputs the AC electric power. Although the frequency and the effective voltage of the AC electric power are set by the user, they are not directly related to the present invention. Therefore, the description of a method for setting the frequency and the effective voltage of the AC electric power is omitted.

The switching circuit 41 includes field-effect transistors FET1 and FET2 connected in series between the DC power supply lines L1 and L2 and field-effect transistors FET3 and FET4 connected in series between the DC power supply lines L1 and L2. An AC electric power supply line L3 is connected to a node of the field-effect transistors FET3 and FET4, and an AC electric power supply line L4 is connected to a node of the field-effect transistors FET1 and FET2.

The PWM controller 42 includes gate control circuits 42a, 42b, 42c, and 42d arranged to control conduction and non-conduction of the field-effect transistors FET1, FET2, FET3, and FET4. The PWM controller 42 is controlled by a computer unit 60, described below, and outputs a pulse train signal to perform switching control (e.g., on-off control) of the field-effect transistors FET1 to FET4 in the switching circuit 41 based on the selected frequency and effective voltage and an actual AC output voltage output to the exterior from the AC electric power supply lines L3 and L4. The pulse train signal is a control signal to convert DC electric power to AC electric power. Rectangular wave AC electric power is output to the AC electric power supply lines L3 and L4 from the inverter circuit 40.

The output circuit 50 includes a filter circuit including a coil 51 and a capacitor 52. The coil 51 is provided halfway on the AC electric power supply line L3. The capacitor 52 is connected between the AC electric power supply lines L3 and L4. The output circuit 50 converts the rectangular wave AC electric power output to the AC electric power supply lines L3 and L4 from the inverter circuit 40 into sine wave AC electric power, and outputs the sine wave AC electric power from a pair of output terminals OUT1 and OUT2. The inverter power generation apparatus according to the present preferred embodiment preferably has no battery. More specifically, no battery is provided in a power supply path from the three-phase winding 12a to the full-wave rectifying circuit 20, the smoothing circuit 30, the inverter circuit 40, and the output circuit 50.

The inverter power generation apparatus includes the computer unit 60 arranged and programmed to control the rotational speed N of the engine 10 and the operation of the inverter circuit 40. The computer unit 60 includes a central processing unit (CPU) 61, a read-only memory (ROM) 62, a random access memory (RAM) 63, and a timer 64. The CPU 61 controls the rotational speed N of the engine 10 by executing a rotational speed control program illustrated in FIG. 6 for each predetermined short period of time (e.g., 25 milliseconds) while controlling the PWM controller 42 by executing a PWM program (not illustrated). The ROM 62 stores the rotational speed control program and the PWM program while storing a conversion table used in the rotational speed control program. The RAM 63 temporarily stores a variable when the rotational speed control program and the PWM program are executed. The timer 64 is used to measure an elapse of a period of time and control various periods of time including intervals for executing the rotational speed control program.

A full-wave rectifying circuit 71, a smoothing circuit 72, and a control power supply circuit 73 are connected in this order to the single-phase winding 12b. The full-wave rectifying circuit 71 includes a single-phase bridge circuit including diodes D4, D5, D6, and D7. The full-wave rectifying circuit 71 converts a single-phase AC current output from the single-phase winding 12b into a DC current using full-wave rectification, and supplies the DC current obtained by the conversion to DC current power supply lines L5 and L6. This causes a DC voltage to be output to the DC power supply lines L5 and L6.

The smoothing circuit 72 includes an electrolytic capacitor connected between the DC power supply lines L5 and L6, and smoothes the DC voltage output from the full-wave rectifying circuit 71. The control power supply circuit 73 converts the DC voltage between the DC power supply lines L5 and L6, which has been smoothed by the smoothing circuit 72, into a DC voltage having a predetermined value, and supplies the DC voltage obtained by the conversion as a power supply voltage to the computer unit 60. The control power supply circuit 73 also supplies the DC voltage to various circuits, to control the operations of the inverter power generation apparatus, such as the voltage stabilizing circuit 21 and the PWM controller 42.

The inverter power generation apparatus also includes an economy mode selection switch 81, a current sensor 82, a voltage sensor 83, and an engine rotational speed sensor 84. The economy mode selection switch 81 selects a normal mode in an OFF state, while selecting an economy mode by the user performing an ON operation. The economy mode selection switch 81 outputs a selection signal representing the normal mode or the economy mode.

The current sensor 82 is provided halfway on the AC output line L4, to detect an AC output current I to be supplied to the exterior and output a detection signal representing the detected AC output current I. The voltage sensor 83 is connected between the AC output lines L3 and L4, to detect an AC output voltage to be output to the exterior and output a detection signal representing the detected AC output voltage. The engine rotational speed sensor 84 is arranged in the vicinity of the output rotating shaft of the engine 10 or the rotating shaft connected thereto, to detect the rotational speed N of the engine 19 and output a detection signal representing the detected rotational speed N.

The economy mode selection switch 81, the current sensor 82, the voltage sensor 83, and the engine rotational speed sensor 84 are connected to an interface circuit 85. The interface circuit 85 inputs detection signals respectively output from the economy mode selection switch 81, the current sensor 82, the voltage sensor 83, and the engine rotational speed sensor 84, and supplies the detection signals to the computer unit 60.

When the detection signals output from the current sensor 82 and the voltage sensor 83 are analog signals, for example, the interface circuit 85 converts the analog signal into a digital signal, and supplies the digital signal to the computer unit 60. When the detection signal output from the engine rotational speed sensor 84 is a pulse train signal corresponding to the rotation of the engine 10, the interface circuit 85 measures the period of the pulse train signal, to calculate the rotational speed N of the engine 10, and supplies a digital signal representing the rotational speed N to the computer unit 60. The computer unit 60 may calculate the rotational speed N.

The control unit 100 illustrated in FIG. 2 includes the full-wave rectifying circuit 20, the voltage stabilizing circuit 21, the smoothing circuit 30, the inverter circuit 40, the switching circuit 41, the output circuit 50, the computer unit 60, the full-wave rectifying circuit 71, the smoothing circuit 72, the control power supply circuit 73, and the interface 85. The economy mode selection switch 81 is provided on the switch panel 6 illustrated in FIG. 1.

The operations of the inverter power generation apparatus according to the present preferred embodiment will be described. The user connects an external AC device operating at AC electric power to the output terminals OUT1 and OUT2 while selecting an operation mode of the engine 10 by operating the economy mode selection switch 81 and then starting the engine 10. Thus, the three-phase winding 12a and the single-phase winding 12b respectively generate a three-phase AC voltage and a single-phase AC voltage when the output rotating shaft of the engine 10 is rotated.

The single-phase AC voltage generated in the single-phase winding 12b is full-wave-rectified by the full-wave rectifying circuit 71 and smoothed by the smoothing circuit 72, and a DC voltage obtained by the smoothing is supplied to the control power supply circuit 73 via the DC power supply lines L5 and L6. The control power supply circuit 73 supplies a DC voltage as a power supply voltage to various control circuits including the computer unit 60 based on the supplied DC voltage. Thus, the control circuits including the computer unit 60 start to operate.

On the other hand, the three-phase AC voltage generated in the three-phase winding 12a is full-wave-rectified by the full-wave rectifying circuit 20 and smoothed by the smoothing circuit 30, and a DC voltage obtained by the smoothing is supplied to the inverter circuit 40 via the DC power supply lines L1 and L2. The inverter circuit 40 converts the supplied DC voltage into a rectangular wave AC voltage, and supplies the AC voltage obtained by the conversion to the output circuit 50. The output circuit 50 converts the supplied rectangular wave AC voltage into a sine wave AC voltage, and supplies the sine wave AC voltage to the external AC device via the output terminals OUT1 and OUT2. Therefore, the external AC device is operable using AC electric power.

In this case, the voltage stabilizing circuit 21 stabilizes the voltage output from the full-wave rectifying circuit 20 by controlling the thyristors T1, T2, and T3 in the full-wave rectifying circuit 20. The CPU 61 executes the PWM program (not illustrated), to control the PWM controller 42 based on the detection signal output from the voltage sensor 83. The PWM controller 42 carries out switching control for the switching circuit 41 in the inverter circuit 40 according to the control of the computer unit 60, to stabilize the AC voltage to be supplied to the external AC device. The CPU 61 repeatedly executes the rotational speed control program illustrated in FIG. 6 for each predetermined short period of time (e.g., 25 milliseconds) based on the control of the timer 64, to control the rotational speed N of the engine 10 according to the AC output current I.

Figure 5:
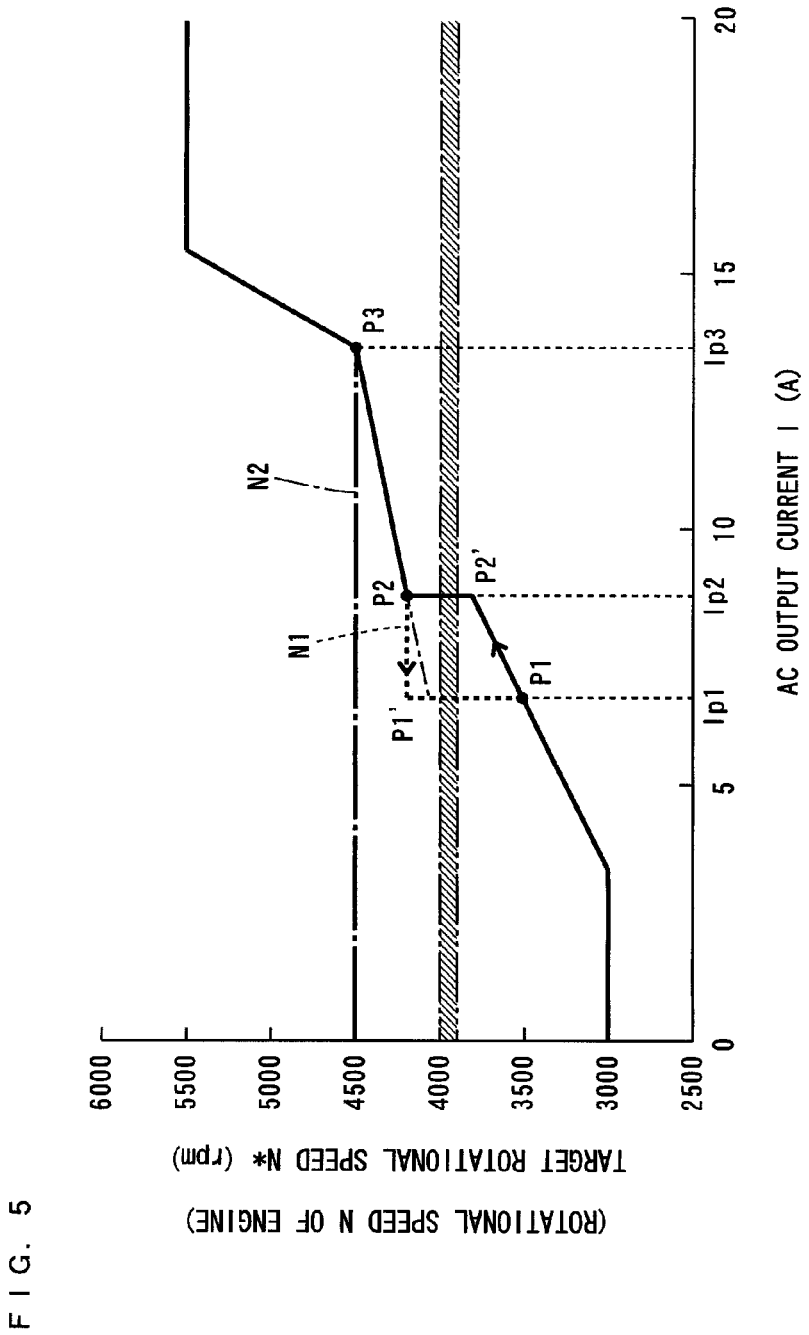
FIG. 5 is a graph illustrating a relationship between an AC output current and a target rotational speed of an engine by the control of a computer unit illustrated in FIG. 4.

The conversion table used in the rotational speed control program will be described. FIG. 5 is a graph illustrating a relationship between the AC output current I by the control of the computer unit 60 illustrated in FIG. 4 and a target rotational speed N* of the engine 10.

The conversion table is used to set the target rotational speed N* of the engine 10 according to the AC output current I by executing the rotational speed control program described in detail below. The conversion table defines the target rotational speed N* corresponding to the AC output current I. A correspondence between the AC output current I and the target rotational speed N* is referred to as conversion characteristics.

A rotational speed at which resonance occurs between the engine 10 and another constituent element (e.g., the electric generator 12) is referred to as a resonance rotational speed (a resonance point). The resonance rotational speed may have one value or may have a certain range.

In this example, the resonance rotational speed is between approximately 3900 rpm and approximately 4000 rpm (a range indicated by oblique hatching in FIG. 5). Thus, the engine 10 easily vibrates at approximately 3900 rpm to approximately 4000 rpm (revolutions per minute).

The target rotational speed N* determined by the conversion table basically increases as the AC output current I increases, as indicated by a thick solid line in FIG. 5.

When the AC output current I is in a range from zero to approximately 3.3 A (amperes), for example, the target rotational speed N* is kept at a predetermined value (e.g., approximately 3000 rpm in this example) lower than the resonance rotational speed. Until the AC output current I exceeds approximately 3.3 A to reach a current value Ip2 (approximately 8.7 A in this example), the target rotational speed N* gradually increases from approximately 3000 rpm to a value (approximately 3800 rpm in this example) lower than the resonance rotational speed.

When the AC output current I reaches the current value Ip2, the target rotational speed N* is set to a value N1 (e.g., approximately 4200 rpm in this example) higher than the resonance rotational speed.

As the AC output current I increases from the current value Ip2 to a current value Ip3 (approximately 13.3 A in this example), the target rotational speed N* gradually increases from the value N1 to a value N2 (approximately 4500 rpm in this example). Furthermore, as the AC output current I increases from the current value Ip3 to approximately 15.5 A, for example, the target rotational speed N* gradually increases from the value N2 to approximately 5500 rpm, for example. A rate of change in the target rotational speed N* in this case is more than a rate of change in the target rotational speed N* during the increase from approximately 3000 rpm to approximately 3800 rpm. Furthermore, when the AC output current I exceeds approximately 15.5 A, the target rotational speed N* is kept at approximately 5500 rpm.

As described above, when the AC output current I increases from a value lower than the current value Ip1 to a value higher than the current value Ip1 (in a first case), the target rotational speed N* is set to a value lower than the resonance rotational speed according to conversion characteristics indicated by a thick solid line until the AC output current I increases to the current value Ip2. When the AC output current I increases to the current value Ip2, the target rotational speed N* is set to a value higher than the resonance rotational speed to avoid the resonance rotational speed. Thus, a period of time required for the engine 10 to rotate at the resonance rotational speed is shortened. More specifically, when the rotational speed of the engine 10 increases, the rotational speed of the engine 10 can increase after quickly passing through the resonance rotational speed. This results in prevention of the vibration of the engine 10 caused by the resonance thereof.

When the AC output current I is at the current value Ip2 and in the vicinity thereof, the target rotational speed N* is set so that the difference between the target rotational speed N* and the resonance rotational speed is sufficiently ensured.

With the inverter power generation apparatus operated in the economy mode, the target rotational speed N* is set according to the conversion characteristics indicated by the thick solid line in FIG. 5 when the AC output current I increases, as described above.

When the AC output current I decreases from the current value Ip2 to the current value Ip1 (approximately 6.7 A in this example) with the inverter power generation apparatus operated in the economy mode, the target rotational speed N* is set according to conversion characteristics indicated by a thick broken line in FIG. 5. Except in a case where the AC output current I decreases from the current value Ip2 to the current value Ip1, the target rotational speed N* is also set according to the conversion characteristics indicated by the thick solid line in FIG. 5 when the AC output current I decreases.

Until the AC output current I decreases from the current value Ip2 to the current value Ip1, the target rotational speed N* is kept at the predetermined value N1 higher than the resonance rotational speed. When the AC output current I decreases to the current value Ip1, the target rotational speed N* is set to a value lower than the resonance rotational speed. When the AC output current I decreases below the current value Ip1, the target rotational speed N* decreases according to the conversion characteristics indicated by the thick solid line in FIG. 5.

As described above, when the AC output current I decreases from a value higher than the current value Ip2 to a value lower than the current value Ip2 (in a second case), the target rotational speed N* is set to a value higher than the resonance rotational speed according to the conversion characteristics indicated by the thick broken line until the AC output current I decreases to the current value Ip1. When the AC output current I decreases to the current value Ip1, the target rotational speed N* is set to a value lower than the resonance rotational speed to avoid the resonance rotational speed. Thus, a period of time required for the engine 10 to rotate at the resonance rotational speed is shortened. More specifically, when the rotational speed of the engine 10 decreases, the rotational speed of the engine 10 can decrease after quickly passing through the resonance rotational speed. This results in prevention of the vibration of the engine 10 caused by the resonance thereof.

When the AC output current I is at the current value Ip1 and in the vicinity thereof, the target rotational speed N* is set so that the difference between the target rotational speed N* and the resonance rotational speed is sufficiently ensured.

When the AC output current I is between approximately zero and the current value Ip3 with the inverter power generation apparatus operated in the normal mode, the target rotational speed N* is kept at the predetermined value N2 higher than the resonance rotational speed according to conversion characteristics indicated by a thick one-dot-and-dash line in FIG. 5. In the other case, the target rotational speed N* is set according to the conversion characteristics indicated by the thick solid line in FIG. 5.

The determinations in the first and second cases and switching of the conversion characteristics are performed using flags, as described below.

As described above, in the present preferred embodiment, the current value Ip2 is greater than the current value Ip1, and the current value Ip3 is greater than the current value Ip2.

Figure 6:
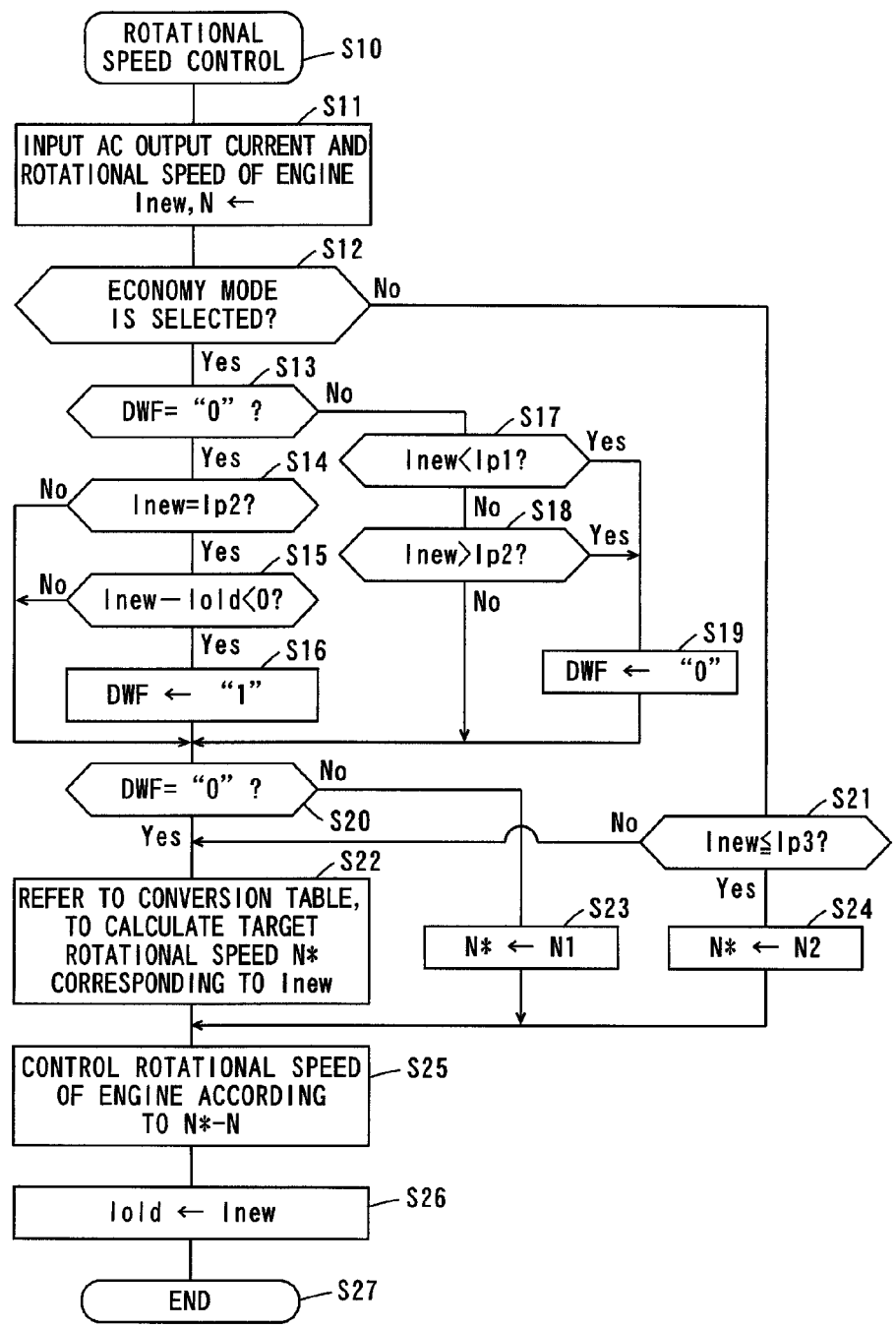
FIG. 6 is a flowchart illustrating a rotational speed control program executed by the computer unit illustrated in FIG. 4.

FIG. 6 is a flowchart illustrating the rotational speed control program executed by the computer unit 60 illustrated in FIG. 4. The control of the rotational speed N of the engine 10 will be described in detail below with reference to the flowchart of FIG. 6.

In step S10, the CPU 61 starts to execute the rotational speed control program. In step S11, the CPU 61 first inputs the AC output current I and the rotational speed N of the engine 10 via the interface circuit 85, respectively, based on detection signals from the current sensor 82 and the engine rotational speed sensor 84, to temporarily store the input rotational speed N and the input AC output current I as a current AC output current Inew.

In this case, the current AC output current Inew represents an AC output current I input when the rotational speed control program is executed at this time. On the other hand, a preceding AC output current Iold, described below, represents an AC output current I input when the rotational speed control program was executed the previous time.

In step S12, the CPU 61 then inputs a selection signal from the economy mode selection switch 81 via the interface circuit 85, and determines whether the economy mode selection switch 81 is set to the economy mode or the normal mode.

A case where the economy mode selection switch 81 selects the economy mode will be first described. If the CPU 61 determines that the economy mode is selected (YES in step S12), then in step S13, the CPU 61 determines whether or not a decrease flag DWF is "0".

The decrease flag DWF represents a state where the target rotational speed N* is set according to the conversion characteristics indicated by the thick solid line in FIG. 5 when "0", and represents a state where the target rotational speed N* is set according to the conversion characteristics indicated by the thick broken line in FIG. 5 when "1". The decrease flag DWF is set to "0" by initialization when the computer unit 60 starts to operate. In the early stages of the control of the rotational speed N of the engine 10, the CPU 61 determines that the decrease flag DWF is set to "0" (YES in step S13). Therefore, the processing proceeds to step S14.

In step S14, the CPU 61 determines whether or not the current AC output current Inew reaches the current value Ip2 (see FIG. 5). Immediately after the engine 10 is started, the current AC output current Inew is low and does not reach the current value Ip2 (NO in step S14). Therefore, the processing proceeds to step S20.

In step S20, the CPU 61 determines whether or not the decrease flag DWF is "0", as in the determination process in step S13. In this case, the decrease flag DWF is also "0" (YES in step S20). Therefore, the processing proceeds to step S22.

In step S22, the CPU 61 refers to the conversion table stored in the ROM 62 (the conversion characteristics indicated by the thick solid line in FIG. 5), to calculate the target rotational speed N* corresponding to the current AC output current Inew. The conversion table stores a discrete (discontinuous) target rotational speed N* corresponding to a discrete current AC output current Inew. Therefore, an interpolation operation is used, as needed, in the calculation of the target rotational speed N*.

In step S25, the CPU 61 then subtracts the current rotational speed N of the engine 10 input in the process in step S11 from the calculated target rotational speed N*, and outputs a control signal representing a control value proportional to a subtraction result N*-N, to control the rotational speed N of the engine 10. The opening adjuster 11 controls a throttle valve so that the rotational speed N of the engine 10 coincides with the target rotational speed N* based on the control signal. More specifically, the throttle valve is controlled so that the opening of the throttle valve increases as the control value increases. When the control value is negative, the throttle valve is controlled so that the opening of the throttle valve decreases as the control value decreases (the absolute value of the control value increases).

In step S26, the CPU 61 then updates the preceding AC output current Iold to the current AC output current Inew. In step S27, the CPU 61 finishes executing the rotational speed control program once. When the rotational speed control program is executed next time, therefore, the AC output current I set when the rotational speed control program is executed this time is set as the preceding AC output current Iold.

When a predetermined short period of time has elapsed, the processing returns to step S10. In step S10, the CPU 61 starts to execute the rotational speed control program again. Also in this case, the economy mode is selected, the decrease flag DWF remains held at "0", and the current AC output current Inew does not reach the current value Ip2. Therefore, the rotational speed N of the engine 10 is controlled to become equal to the target rotational speed N*, as in the processes in steps S22 and S25. The above-described processes are repeated. Even if the state of a load on the external AC device varies so that the AC output current I changes, therefore, the rotational speed N of the engine 10 remains controlled to become equal to the target rotational speed N* indicated by the thick solid line in FIG. 5. The rotational speed N of the engine 10 is thus controlled according to the state of the load on the external AC device. If AC electric power required in the external AC device is low, for example, the rotational speed N of the engine 10 decreases. Therefore, fuel consumed by the engine 10 can be reduced. As a result, the fuel consumption of the inverter power generation apparatus can be improved.

If the AC output current I increases and reaches the current value Ip2 (see FIG. 5) by the variation in the state of the load on the external AC device, the CPU determines that the AC output current I reaches the current value Ip2 (YES in step S14). The processing then proceeds to step S15.

In step S15, the CPU 61 subtracts the preceding AC output current Iold from the current AC output current Inew, and determines whether or not a subtraction result Inew-Iold is negative. In this case, the CPU 61 determines whether the AC output current I (i.e., the rotational speed N of the engine 10) tends to increase or tends to decrease.

When the AC output current I increases and reaches the current value Ip2 (YES in step S14), as described above, the current AC output current Inew is more than the preceding AC output current Iold (NO in step S15). Therefore, the processing proceeds to step S20, as described above. In this case, the decrease flag DWF also remains held at "0". Therefore, the CPU 61 sets the target rotational speed N* according to the conversion table (the conversion characteristics indicated by the thick solid line) by the processes in steps S22 and S25, and controls the opening adjuster 11 so that the rotational speed N of the engine 10 becomes equal to the target rotational speed N*.

In this case, at the time point where (or immediately after) the AC output current I reaches the current value Ip2, the target rotational speed N* is switched from a value (approximately 3800 rpm in this example) at a point P2' to the value N1 (approximately 4200 rpm in this example) at a point P2 to avoid the resonance rotational speed (approximately 3800 rpm to approximately 4200 rpm in this example).

Thus, a period of time required for the engine 10 to rotate at the resonance rotational speed (approximately 3900 rpm to approximately 4000 rpm in this example) is shortened. More specifically, the rotational speed of the engine 10 increases after quickly passing through the resonance rotational speed. Even when the rotational speed N of the engine 10 increases due to the increase in the AC output current I in the inverter power generation apparatus, therefore, the vibration of the engine 10 caused by the resonance thereof is prevented, so that great noise is not generated.

When a load current of the external AC device further increases so that the AC output current I increases, the rotational speed N of the engine 10 is controlled to become equal to the target rotational speed N* according to the conversion characteristics indicated by the thick solid line at the upper right of the point P2 in FIG. 5.

On the other hand, when the AC output current I decreases and reaches the current value Ip2 (see FIG. 5) from a state where the rotational speed N of the engine 10 is higher than the target rotational speed N* at the point P2, the CPU also determines that the AC output current I reaches the current value Ip2 (YES in step S14), and executes the determination process in step S15.

In this case, the current AC output current Inew is less than the preceding AC output current Iold. Therefore, the CPU 61 determines that the subtraction result Inew-Iold obtained by subtracting the preceding AC output current Iold from the current AC output current Inew becomes negative (YES in step S15). Therefore, the processing proceeds to step S16. In step S16, the CPU 61 sets the decrease flag DWF to "1".

In this case, the CPU 61 determines that the decrease flag DWF is "1" (NO in step S20). The processing then proceeds to step S23. In step S23, the CPU 61 sets the target rotational speed N* to the predetermined value N1. In step S25, the CPU 61 then controls the opening adjuster 11 so that the rotational speed N of the engine 10 becomes equal to the target rotational speed N*, as described above. The rotational speed N of the engine 10 thus becomes equal to the value N1.

When the rotational speed control program is then executed, the decrease flag DWF is set to "1". Therefore, the CPU 61 determines that the decrease flag SWF is not "0" (NO in step S13). The processing then proceeds to step S17. In step S17, the CPU 61 determines whether or not the current AC output current Inew is less than the current value Ip1 corresponding to the point P1' illustrated in FIG. 5 (or is the current value Ip1 or less). If the current AC output current Inew is the current value Ip1 or more (or more than the current value Ip1) corresponding to a point P1' illustrated in FIG. 5 (NO in step S17), the processing proceeds to step S18. In step S18, the CPU 61 determines whether or not the current AC output current Inew is more than the current value Ip2 corresponding to the point P2 illustrated in FIG. 5.

If the current AC output current Inew is the current value Ip1 or more (or more than the current value Ip1) (NO in step S17) and is the current value Ip2 or less (NO in step S18), the processing proceeds to step S20. In this case, the decrease flag DWF is kept at "1" (NO in step S20). Therefore, the processing proceeds to step S23. In step S23, the CPU 61 sets the target rotational speed N* to the value N1, as described above. In this case, the CPU 61 controls the opening adjuster 11 so that the rotational speed N of the engine 10 becomes equal to the target rotational speed N*. As long as the AC output current I is the current value Ip1 or more (or more than the current value Ip1) and is the current value Ip2 or less, therefore, the rotational speed N of the engine 10 remains held at the predetermined value N1, as indicated by the thick broken line in FIG. 5.

On the other hand, if the current AC output current Inew is less than the current value Ip1 (or is the current value Ip1 or less) (YES in step S17), the processing proceeds to step S19. In step S19, the CPU 61 changes the decrease flag DWF to "0".

Therefore, the CPU 61 determines that the decrease flag DWF is "0" (YES in step S20). In this case, the CPU 61 sets the target rotational speed N* according to the conversion table (the conversion characteristics indicated by the thick solid line) in step S22, and controls the opening adjuster 11 so that the rotational speed N of the engine 10 becomes equal to the target rotational speed N* in step S25.

In this case, at the time point where the current AC output current I is less than the current value Ip1 (or the current value Ip1 or less), the target rotational speed N* is switched from the value N1 (approximately 4200 rpm in this example) at the point P1' to a value (approximately 3500 rpm in this example) at a point P1 to avoid the resonance rotational speed (approximately 3500 rpm to approximately 4200 rpm in this example).

In this case, a period of time required for the engine 10 to rotate at the resonance rotational speed (approximately 3900 rpm to approximately 4000 rpm in this example) is also shortened. More specifically, the rotational speed of the engine 10 decreases after quickly passing through the resonance rotational speed. Even when the rotational speed N of the engine 10 decreases due to the decrease in the AC output current I in the inverter power generation apparatus, therefore, the vibration of the engine 10 caused by the resonance thereof is prevented, so that great noise is not generated.

When the current AC output current Inew becomes lower than the current value Ip2 (i.e., with the decrease flag DWF set to "1"), and then becomes higher than the current value Ip2 again, the CPU 61 determines that the current AC output current Inew is more than the current value Ip2 (YES in step S18). The processing then proceeds to step S19. In step S19, the CPU 61 changes the decrease flag DWF to "0". In this case, the CPU 61 also determines that the decrease flag DWF is "0" (YES in step S20), and the CPU 61 sets the target rotational speed N* according to the conversion table (the conversion characteristics indicated by the thick solid line) in step S22, and controls the opening adjuster 11 so that the rotational speed N of the engine 10 becomes equal to the target rotational speed N* in step S25. Thus, the rotational speed N of the engine 10 is controlled to become equal to the target rotational speed N* according to the thick solid line positioned at the upper right of the point P2 in FIG. 5 again.

A case where the user chooses to operate the inverter power generation apparatus in the normal mode without turning the economy mode selection switch 81 on will be described.

In this case, the CPU 61 determines that the economy mode selection switch 81 selects the normal mode (NO in step S12). Therefore, the processing proceeds to step S21. In step S21, the CPU 61 determines whether or not the current AC output current Inew is the current value Ip3 or less corresponding to a point P3 illustrated in FIG. 5. If the current AC output current Inew is the current value Ip3 or less (YES in step S21), the processing proceeds to step S24. In step S24, the CPU 61 sets the target rotational speed N* to the predetermined value N2.

The CPU 61 then controls the opening adjuster 11 so that the rotational speed N of the engine 10 becomes equal to the target rotational speed N* in step 25, as described above. Thus, the rotational speed N of the engine 10 is controlled to be the predetermined value N2.

As long as the current AC output current Inew is the current value Ip3 or less (YES in step S21), the CPU 61 executes the processes in steps S24 and S25. Therefore, the rotational speed of the engine 10 remains held at the predetermined value N2.

On the other hand, if the current AC output current Inew becomes higher than the current value Ip3 (NO in step S21), the CPU 61 sets the target rotational speed N* according to the conversion table (the conversion characteristics indicated by the thick solid line) in step S22, and controls the opening adjuster 11 so that the rotational speed N of the engine 10 becomes equal to the target rotational speed N* in step s25. Thus, the rotational speed N of the engine 10 is controlled to be the target rotational speed N* according to the conversion characteristics indicated by the thick solid line positioned at the upper right of the point P3 in FIG. 5.

Figure 9:
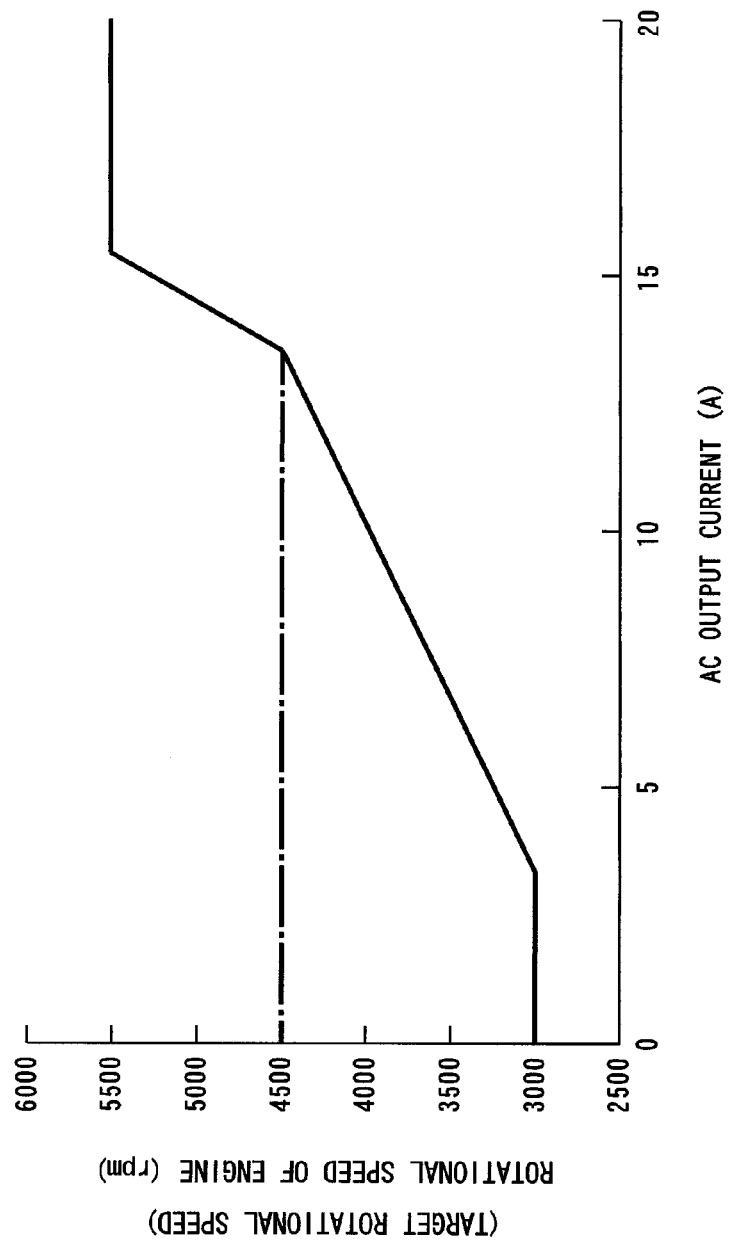
FIG. 9 is a graph illustrating a relationship between an AC output current and a target rotational speed of an engine in a portable inverter power generation apparatus in a comparative example.

A relationship between an AC output current and a target rotational speed of an engine in an inverter power generation apparatus in a comparative example will be described. FIG. 9 is a graph illustrating the relationship between the AC output current and the target rotational speed of the engine in the inverter power generation apparatus in the comparative example.

In the inverter power generation apparatus in the comparative example, the target rotational speed of the engine gradually increases as the AC output current increases, as indicated by a thick solid line in FIG. 9. According to the inverter power generation apparatus in the comparative example, when AC electric power required by the AC device is low, the rotational speed of the engine decreases. Thus, fuel consumed by the engine is reduced. Therefore, the fuel consumption of the inverter power generation apparatus can be improved.

However, the target rotational speed changes continuously and over a wide range as the AC output current changes. When the rotational speed of the engine becomes a rotational speed at which the engine resonates (i.e., a resonance rotational speed), the engine vibrates thereby generating noise.

Particularly, the rotational speed of the engine is controlled continuously and over a wide range at less than a rotational speed (e.g., less than 4500 rpm, which is indicated by the thick one-dot-and-dash line in FIG. 9) at which the engine easily resonates, as indicated by a solid line in FIG. 9. Thus, the engine easily vibrates.

On the other hand, in the inverter power generation apparatus according to the present preferred embodiment, the target rotational speed N* is set to a value lower than the resonance rotational speed until the AC output current I increases from the current value Ip1 to the current value Ip2, while being set to a value higher than the resonance rotational speed when the AC output current I increases to the current value Ip2. More specifically, when the AC output current I increases, the target rotational speed N* greatly increases discontinuously at the time point where the AC output current I reaches the current value Ip2. The target rotational speed N* is set to a value higher than the resonance rotational speed until the AC output current I decreases from the current value Ip2 to the current value Ip1, while being set to a value lower than the resonance rotational speed when the AC output current I decreases to the current value Ip1. More specifically, when the AC output current I decreases, the rotational speed N of the engine 10 greatly decreases discontinuously at the time point where the AC output current I reaches the current value Ip1.

Thus, a period of time required for the engine 10 to rotate at the resonance rotational speed when the rotational speed of the engine 10 increases and decreases is shortened. More specifically, the rotational speed of the engine 10 increases or decreases after quickly passing through the resonance rotational speed. This results in prevention of the vibration of the engine 10 caused by the resonance thereof. As a result, great noise is not generated.

When the AC output current I repeatedly increases and decreases in the vicinity of the current value Ip2 depending on the state of the load on the external AC device, the target rotational speed N* is not repeatedly switched to a value lower than the resonance rotational speed and a value higher than the resonance rotational speed. Similarly, when the AC output current I repeatedly decreases and increases in the vicinity of the current value Ip1 depending on the state of the load, the target rotational speed N* is not repeatedly switched to a value higher than the resonance rotational speed and a value lower than the resonance rotational speed. This avoids the rotational speed of the engine 10 suddenly changing repeatedly in a short period of time. Therefore, no great burden is imposed on the engine 10.

The current value Ip1 is less than the current value Ip2. If the target rotational speed N* is decreased with the decrease in the AC output current I, the difference between the target rotational speed N* and the resonance rotational speed becomes small at the current value Ip1. In the present preferred embodiment, when the AC output current I decreases from the current value Ip2 to the current value Ip1, the target rotational speed N* is set to the predetermined value N1. In this case, the absolute value (700 rpm in this example) of an amount of change in the target rotational speed N* when the AC output current decreases to the current value Ip1 is more than the absolute value (400 rpm in this example) of an amount of change in the target rotational speed N* when the AC output current I increases to the current value Ip2. This prevents the difference between the target rotational speed N* and the resonance rotational speed from decreasing. Thus, a period of time required for the engine 10 to rotate at the resonance rotational speed is reliably shortened. This results in reliable prevention of the vibration of the engine 10 caused by the resonance thereof. This further results in reduction in a burden on the processing of the CPU 61 when the AC output current I decreases from the current value Ip2 to the current value Ip1.

The amount of change in the target rotational speed N* at the current value Ip2 during the increase in the AC output current I is equal to the difference in the target rotational speed N* between the points P2' and P2. The amount of change in the target rotational speed N* at the current value Ip1 during the decrease in the AC output current I is equal to the difference in the target rotational speed N* between the points P1' and P1.

In the engine 10, generally when the rotational speed N of the engine 10 decreases due to a decrease in the load current of the external AC device, vibration is liable to be generated more easily at the resonance rotational speed or in the vicinity thereof than when the rotational speed N of the engine 10 increases by the increase in the load current of the external AC device. As described above, the absolute value (700 rpm in this example) of the amount of change in the target rotational speed N* when the rotational speed N of the engine 10 decreases is set higher than the absolute value (400 rpm in this example) of the amount of change in the target rotational speed N* when the rotational speed N of the engine 10 increases. This can reliably prevent the vibration of the engine 10 caused by the resonance thereof and enables reliable reduction in the generation of noise by the engine 10.

Furthermore, in the economy mode, the generation of the vibration of the engine 10 caused by the resonance thereof is prevented without imposing the great burden on the engine 10 while the rotational speed N of the engine 10 changes properly and efficiently depending on the state of the load. This results in improvement in the fuel consumption of the portable inverter power generation apparatus while resulting in prevention of the generation of noise by the resonance of the engine 10. In the normal mode, the engine 10 rotates at a predetermined rotational speed higher than the resonance rotational speed. Therefore, the generation of noise is prevented, and the rotation of the engine 10 is stabilized.

The present invention may be practiced without being limited to the above-described preferred embodiment, and various changes can be made to the above-described preferred embodiment of the present invention.

In the above-described preferred embodiment, the engine 10 preferably has one resonance rotational speed between approximately 3900 rpm to approximately 4000 rpm. However, the resonance rotational speed may differ from the above-described rotational speed depending on the structure of the engine 10. In this case, the target rotational speed N* is set to avoid a resonance rotational speed different from the above-described resonance rotational speed and its vicinity. A plurality of different resonance rotational speeds may exist depending on the structure of the engine 10. In this case, the target rotational speed N* is set to avoid a plurality of resonance rotational speeds and their vicinities.

Figure 7:
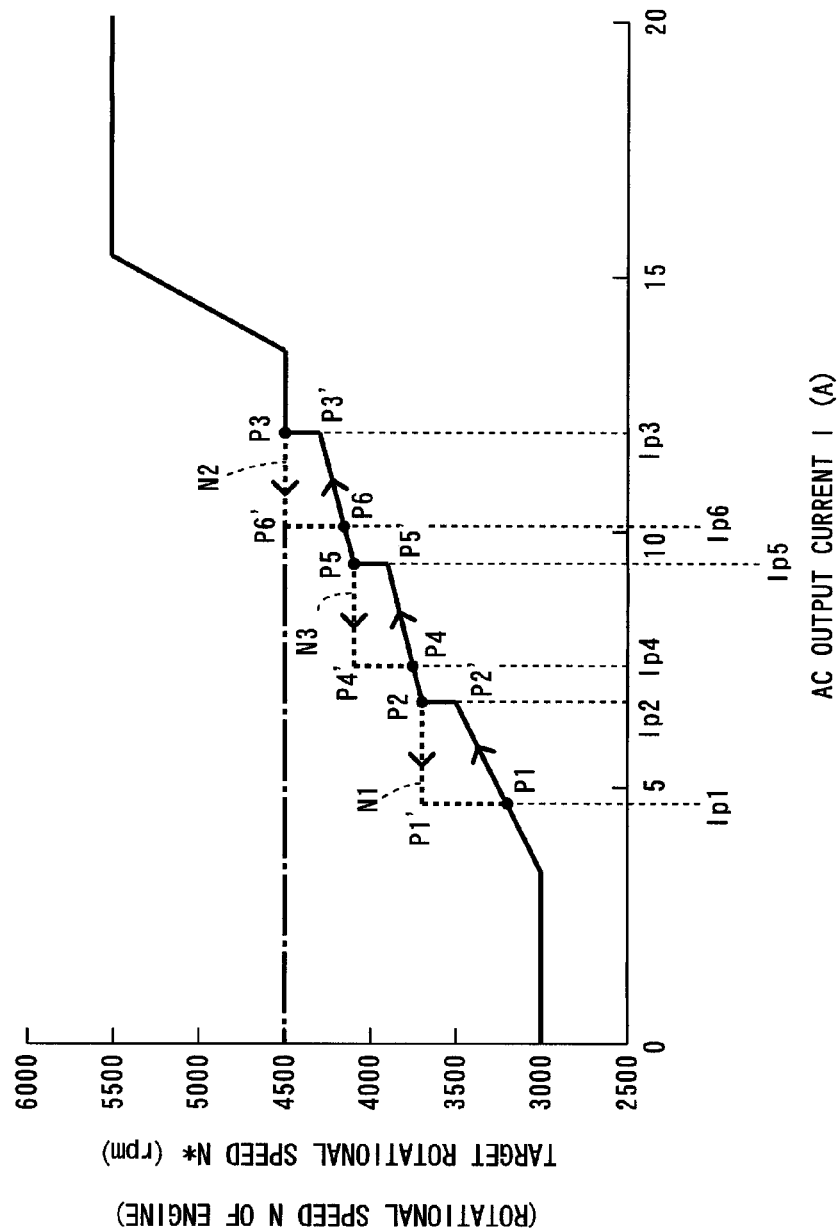
FIG. 7 is a graph illustrating a relationship between an AC output current and a target rotational speed of an engine in a modified example of a preferred embodiment of the present invention.

FIG. 7 is a graph illustrating a relationship between an AC output current and a target rotational speed of an engine in a modified example.

The control of a CPU 61 carried out when three resonance rotational speeds exist will be described as an example of a case where a plurality of resonance rotational speeds exists. In this case, a target rotational speed N* of an engine 10 determined by a conversion table changes, as indicated by a thick solid line in FIG. 7. Points P1, P1', P2, P2', and P3 illustrated in FIG. 7 are the same as those illustrated in FIG. 5. The respective values of the AC output current I and the target rotational speed N* corresponding to each of the points P1, P1', P2, and P2' illustrated in FIG. 7 differ from those illustrated in FIG. 5

A current value corresponding to the points P1 and P1' is Ip1, a current value corresponding to the points P2 and P2' is Ip2, and a current value corresponding to the points P4 and P4' is Ip4. A current value corresponding to the points P5 and P5' is Ip5, a current value corresponding to the points P6 and P6' is Ip6, and a current value corresponding to the points P3 and P3' is Ip3.

In the example illustrated in FIG. 7, when the AC output current I increases, the target rotational speed N* is set to a value higher than a resonance rotational speed existing between the points P2' and P2 to avoid the resonance rotational speed at the point P2. In the example illustrated in FIG. 7, when the AC output current I increases, the target rotational speed N* is also set to values respectively higher than a resonance rotational speed existing between the points P5' and P5 and a resonance rotational speed existing between the points P3' and P3 to avoid the resonance rotational speeds at the points P5 and P3.

Furthermore, when the AC output current I decreases, the target rotational speed N* is set to a value lower than a resonance rotational speed existing between the points P1' and P1 to avoid the resonance rotational speed at the point P1. The target rotational speed N* is also set to values respectively lower than a resonance rotational speed existing between the points P4' and P4 and a resonance rotational speed existing between the points P6' and P6 to avoid the resonance rotational speeds at the points P4 and P6.

When the AC output current I decreases, the target rotational speed N* is fixed to a predetermined value N1 between the points P2 and P1'. The target rotational speed N* is also fixed to predetermined values N3 and N2, respectively, between the points P5 and P4' and between the points P3 and P6'. In these cases, the absolute values of amounts of change in the target rotational speed N* at the current values Ip1, Ip4, and Ip6 when the AC output current I decreases are respectively more than the absolute values of amounts of change in the target rotational speed N* at the current values Ip2, Ip5, and Ip3 when the AC output current I increases.

The amounts of change in the target rotational speed N* at the current values Ip2, Ip5, and Ip3 when the AC output current I increases are respectively equal to differences in the target rotational speed N* between the points P2' and P2, between the points P5' and P5, and between the points P3' and P3. The amounts of change in the target rotational speed N* at the current values Ip1, Ip4, and Ip6 when the AC output current I decreases are respectively equal to differences in the target rotational speed N* between the points P1' and P1, between the points P4' and P4, and between the points P6' and P6.

In order to set the target rotational speed N* according to such conversion characteristics, the CPU 61 repeats a rotational speed control program obtained by modifying a portion of the rotational speed control program illustrated in FIG. 6 for each predetermined short period of time, as in the above-described preferred embodiment.

Figure 8:
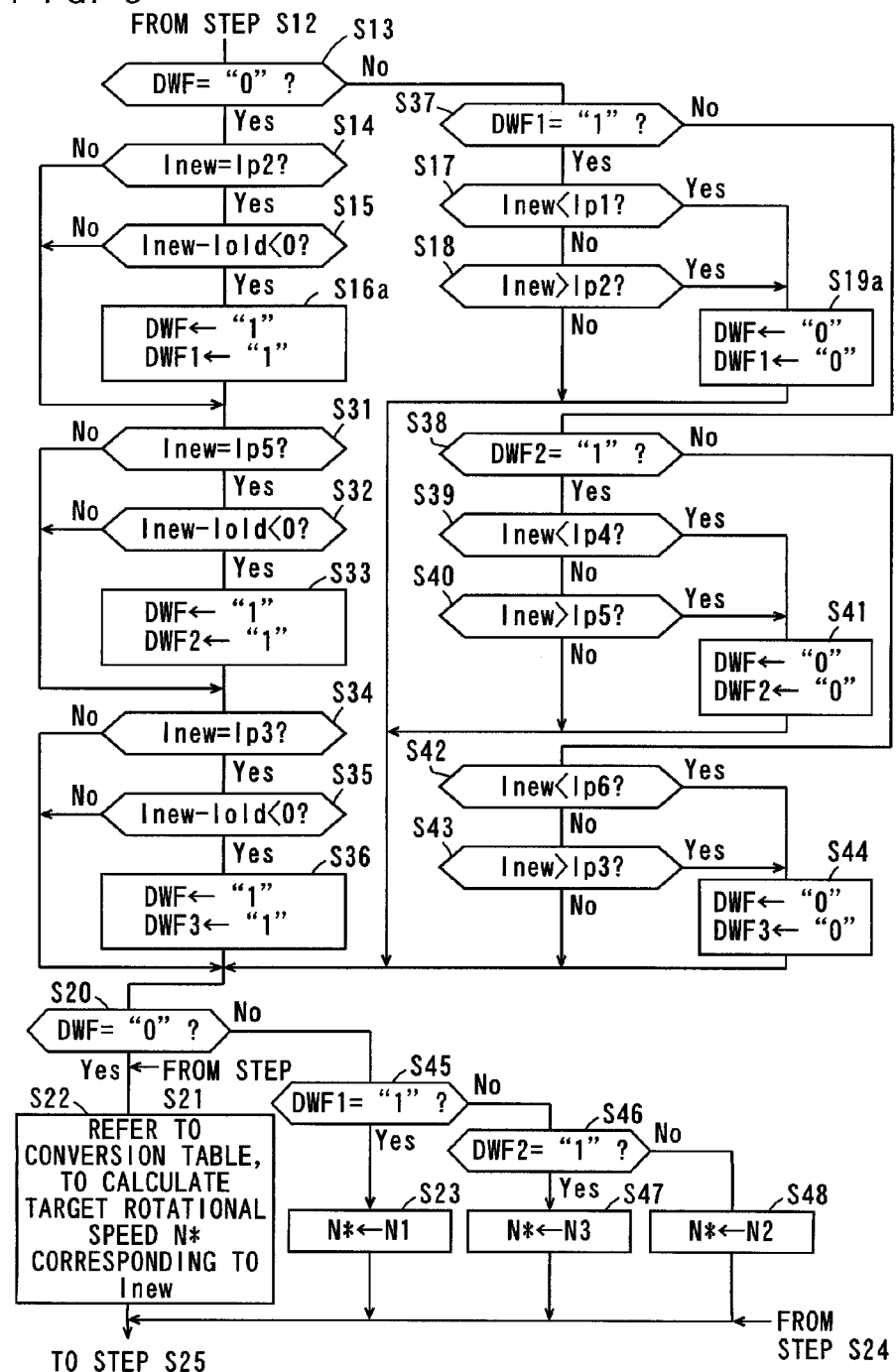
FIG. 8 is a flowchart illustrating a portion of a rotational speed control program according to the modified example of a preferred embodiment of the present invention.

FIG. 8 is a flowchart illustrating a portion of the rotational speed control program according to a modified example of the preferred embodiment described above.

In the rotational speed control program according to the modified example, the processes between steps S12 and S25 illustrated in FIG. 6 are changed into those as illustrated in FIG. 8. In the rotational speed control program according to the modified example, processes in steps S21 and S24 are the same as those illustrated in FIG. 6 and hence, the illustration of steps S21 and S24 is omitted in FIG. 8. In the flowchart illustrated in FIG. 8, the same processes as those in the flowchart illustrated in FIG. 6 are assigned the same reference numerals. Furthermore, in the modified example, the configuration of the inverter power generation apparatus is also the same as the configuration illustrated in FIG. 4.

The rotational speed control program according to the modified example will be described. If the CPU 61 determines whether or not a decrease flag DWF is set to "0" with an economy mode selected (YES in step S13), the CPU 61 performs processes in steps S14, S15, S16a, and S31 to S36, as in the above-described preferred embodiment.

In this case, the CPU 61 also keeps the decrease flag DWF at "0" as long as a current AC output current Inew does not reach a current value Ip2 while decreasing by the processes in steps S14, S15, and S16a, as in the above-described preferred embodiment.

On the other hand, if the current AC output current Inew reaches the current value Ip2 while decreasing (YES in steps S14 and S15), then in step S16a, the CPU 61 changes the decrease flag DWF to "1". In this case, the CPU 61 changes a first decrease sub-flag DWF1 to "1" by the process in step S16a, unlike in the above-described preferred embodiment.

The first decrease sub-flag DWF1 represents a state where the target rotational speed N* is fixed to the predetermined value N1, i.e., a state where the target rotational speed N* is set according to conversion characteristics indicated by a thick broken line between the points P2 and P1' when "1", while representing the other state when "0". The first decrease sub-flag DWF1 is set to "0" in the early stages.

After the processes in steps S14, S15, and S16a, the CPU 61 executes processes in steps S31, S32, and S33. The processes in steps S31, S32, and S33 are similar to the processes in steps S14, S15, and S16a except that the current AC output current Inew is compared with the current value Ip5 in step S31 and that the decrease flag DWF is set to "1" and a second decrease sub-flag DWF2 is set to "1" in step S33. The CPU 61 keeps the decrease flag DWF at "0" as long as the current AC output current Inew does not reach the current value Ip5 while decreasing by the processes in steps S31 to S33.

On the other hand, if the current AC output current Inew reaches the current value Ip5 while decreasing (YES in steps S31 and S32), then in step S33, the CPU 61 changes the decrease flag DWF and the second decrease sub-flag DWF2 to "1". The second decrease sub-flag DWF2 represents a state where the target rotational speed N* is fixed to the predetermined value N3, i.e., a state where the target rotational speed N* is set according to conversion characteristics indicated by a thick broken line between the points P5 and P4' when "1", while representing the other state when "0". The second decrease sub-flag DWF2 is set to "0" in the early stages.

After the processes in steps S31 to S33, the CPU 61 executes processes in steps S34, S35, and S36. The processes in steps S34, S35, and S36 are similar to the processes in steps S14, S15, and S16a except that the current AC output current Inew is compared with the current value Ip3 in step S34 and that the decrease flag DWF is set to "1" and a third decrease sub-flag DWF3 is set to "1" in step S36. The CPU 61 keeps the decrease flag DWF at "0" as long as the current AC output current Inew does not reach the current value Ip3 while decreasing by the processes in steps S34 to S36.

On the other hand, if the current AC output current Inew reaches the current value Ip3 while decreasing (YES in steps S34 and S35), then in step S36, the CPU 61 changes the decrease flag DWF and the third decrease sub-flag DWF3 to "1". The third decrease sub-flag DWF3 represents a state where the target rotational speed N* is fixed to the predetermined value N2, i.e., a state where the target rotational speed N* is set according to conversion characteristics indicated by a thick broken line between the points P3 and P6' when "1", while representing the other state when "0". The third decrease sub-flag DWF3 is set to "0" in the early stages.

After the processes in steps S34 to S36, the processing proceeds to step S20, as in the above-described preferred embodiment. In step S20, the CPU 61 determines whether or not the decrease flag DWF is "0". If the decrease flag DWF is "0" (YES in step S20), then in step S22, the CPU 61 refers to the conversion table, to calculate the target rotational speed N* corresponding to the current AC output current Inew. In this case, the target rotational speed N* is set according to the conversion table (the conversion characteristics indicated by the thick solid line), and is controlled so that the rotational speed N of the engine 10 becomes equal to the target rotational speed N*.

On the other hand, if the decrease flag DWF is "1" (NO in step S20), the CPU 61 executes determination processes in steps S45 and S46. In step S45, the CPU 61 first determines whether or not the first decrease sub-flag DWF1 is "1". In step S46, the CPU 61 then determines whether or not the second decrease sub-flag DWF2 is "1". If the first decrease sub-flag DWF is "1" (YES in step S45), then in step S23, the CPU 61 sets the target rotational speed N* to the predetermined value N1. If the second decrease sub-flag DWF2 is "1" (YES in step S46), then in step S47, the CPU 61 sets the target rotational speed N* to the predetermined value N3. If the third decrease sub-flag DWF3 is "1", the first decrease sub-flag DWF1 and the second decrease sub-flag DWF2 are "0" (NO in steps S45 and S46). Therefore, in step S48, the CPU 61 sets the target rotational speed N* to the predetermined value N2.

If the current AC output current Inew reaches the current value Ip2 while decreasing by the processes in steps S20, S23, and S45 to S48, the rotational speed of the engine 10 remains held at the predetermined value N1. If the current AC output current Inew reaches the current value Ip5 while decreasing, the rotational speed N of the engine 10 remains held at the predetermined value N3. If the current AC output current Inew reaches the current value Ip3 while decreasing, the rotational speed N of the engine 10 remains held at the predetermined value N2.

If the decrease flag DWF is set to "1" (NO "1" in step S13), the CPU 61 executes processes in step S37 and the subsequent steps, as in the above-described preferred embodiment. In step S37, the CPU 61 first determines whether or not the first decrease sub-flag DWF1 is "1". If the first decrease sub-flag DWF1 is "1" (YES in step S37), the CPU 61 executes determination processes in steps S17 and S18, as in the above-described preferred embodiment. In this case, unless the current AC output current Inew becomes lower than the current value Ip1 or becomes higher than the current Ip2 (NO in steps S17 and S18), the processing proceeds to step S20.

In this case, the decrease sub-flag DWF and the first decrease sub-flag DWF1 remain set to "1". The target rotational speed N* remains held at the predetermined value N1 by the processes in steps S20, S45, and S23. Therefore, the rotational speed of the engine 10 remains controlled to be the predetermined value N1.

On the other hand, if the current AC output current Inew becomes lower than the current value Ip1 (YES in step S17), or if the current AC output current Inew becomes higher than the current value Ip2 (YES in step S18), then in step S19a, the CPU 61 returns both the decrease flag DWF and the first decrease sub-flag DWF1 to "0". The processing then proceeds to step S20. In this case, the target rotational speed N* is set according to the conversion table (the conversion characteristics indicated by the thick solid line) by the above-described processes in steps S20 and S22, and is controlled again so that the rotational speed N of the engine 10 becomes equal to the target rotational speed N*.

If the first decrease flag DWF1 is set to "0" (NO in step S37), then in step S38, the CPU 61 determines whether or not the second decrease sub-flag DWF2 is "1". If the second decrease sub-flag DWF2 is "1" (YES in step S38), the CPU 61 executes processes in steps S39, S40, and S41. The processes in steps S39, S40, and S41 are similar to the processes in steps S17, S18, and S19a except that the CPU 61 determines whether or not the current AC output current Inew is less than the current value Ip4 in step S39, that the CPU 61 determines whether or not the current AC output current Inew is more than the current value Ip5 in step S40, and that the second decrease sub-flag DWF2 is set to "0" in step S41.

Unless the current AC output current Inew becomes lower than the current value Ip4 or becomes higher than the current value Ip5 (NO in steps S39 and S40), therefore, the decrease flag DWF and the second decrease sub-flag DWF2 remain set to "1". In this case, the target rotational speed N* remains held at the predetermined value N3 by the processes in steps S20, S45, S46, and S47. Therefore, the rotational speed N of the engine 10 remains controlled to be the predetermined value N3.

On the other hand, if the current AC output current Inew becomes lower than the current value Ip4 (YES in step S39), or if the current AC output current Inew becomes higher than the current value Ip5 (YES in step S40), then in step S41, the CPU 61 returns both the decrease flag DWF and the second decrease sub-flag DWF2 to "0". The processing then proceeds to step S20. In this case, the target rotational speed N* is set according to the conversion table (the conversion characteristics indicated by the thick solid line) by the above-described processes in steps S20 and S22, and is controlled again so that the rotational speed N of the engine 10 becomes equal to the target rotational speed N*.

If the first decrease sub-flag DWF1 is set to "0" (NO in step S37), and if the second decrease sub-flag DWF2 is set to "0" (NO in step S38), i.e., the third decrease sub-flag DWF3 is set to "1", the CPU 61 executes processes in steps S42 to S44. The processes in steps S42 to S44 are similar to the processes in steps S17, S18, and S19a except that the CPU 61 determines whether or not the current AC output current Inew is less than the current value Ip6 in step S42, that the CPU 61 determines whether or not the current AC output current Inew is more than the current value Ip3 in step S43, and that the third decrease sub-flag DWF3 is set to "0" in step S44.

Unless the current AC output current Inew becomes lower than the current value Ip6 or becomes higher than the current value Ip3 (NO in steps S42 and S43), therefore, the decrease flag DWF and the third decrease sub-flag DWF3 remain set to "1". In this case, the target rotational speed N* remains held at the predetermined value N2 by the processes in steps S20, S45, S46, and S48. Therefore, the rotational speed N of the engine 10 remains controlled to be the predetermined value N2.

On the other hand, if the current AC output current Inew becomes lower than the current value Ip6 (YES in step S42), or if the current AC output current Inew becomes higher than the current value Ip3 (YES in step S43), then in step S44, the CPU 61 returns both the decrease flag DWF and the third decrease sub-flag DWF3 to "0". The processing then proceeds to step S20. In this case, the target rotational speed N* is set according to the conversion table (the conversion characteristics indicated by the thick solid line) by the above-described processes in steps S20 and S22, and is controlled again so that the rotational speed N of the engine 10 becomes equal to the target rotational speed N*.

According to this modified example, even if the plurality of resonance rotational speeds exists, the target rotational speed N* is set to avoid the plurality of resonance rotational speeds and is controlled so that the rotational speed N of the engine 10 becomes equal to the target rotational speed N*. Thus, a period of time required for the engine 10 to rotate at the resonance rotational speed N is shortened. More specifically, the rotational speed of the engine 10 increases or decreases after quickly passing through the resonance rotational speeds. Even when the rotational speed N of the engine 10 changes over a wide range according to a change in the AC output current I, therefore, the generation of the vibration of the engine 10 caused by the resonance thereof at the plurality of resonance rotational speeds is reliably prevented. This results in prevention of the generation of noise without imposing a great burden on the engine 10.

When the AC output current I repeatedly increases and decreases in the vicinity of each of the current values Ip2, Ip5, and Ip3 depending on the state of the load on the external AC device, the target rotational speed N* is not repeatedly switched to a value lower than the resonance rotational speed and a value higher than the resonance rotational speed. Similarly, when the AC output current I repeatedly decreases and increases in the vicinity of each of the current values Ip1, Ip4, and Ip6 depending on the state of the load, the target rotational speed N* is not repeatedly switched to a value higher than the resonance rotational speed and a value lower than the resonance rotational speed. This avoids the rotational speed of the engine 10 suddenly changing repeatedly in a short period of time. Therefore, no great burden is imposed on the engine 10.

Furthermore, the target rotational speed N* is set to the predetermined value N1 when the AC output current I decreases from the current value Ip2 to the current value Ip1, is set to the predetermined value N3 when the AC output current I decreases from the current value Ip5 to the current value Ip4, and is set to the predetermined value N2 when the AC output current I decreases from the current value Ip3 to the current value Ip6. In this case, the absolute values of the amounts of change in the target rotational speed N* at the current values Ip1, Ip4, and Ip6 are respectively more than the absolute values of the amounts of change in the target rotational speed N* at the current values Ip2, Ip5, and Ip3. This prevents the target rotational speed N* from approaching the resonance rotational speed. Thus, a period of time required for the engine 10 to rotate at the resonance rotational speed is reliably shortened. This results in reliable prevention of the vibration of the engine 10 caused by the resonance thereof. The burden on the processing of the CPU 61 is reduced when the AC output current I decreases from the current value Ip2 to the current value Ip1, when the AC output current I decreases from the current value Ip5 to the current value Ip4, and when the AC output current I decreases from the current value Ip3 to the current value Ip6.

In the preferred embodiment and the modified example thereof described above, the conversion table is preferably used to calculate the target rotational speed N* that changes according to the AC output current I. The conversion table may be replaced with a function incorporated into a rotational speed control program or a function stored separately from the rotational speed control program within a ROM 62 to calculate a target rotational speed N* that changes according to an AC output current I. In this case, the function is defined as conversion characteristics illustrated in FIG. 5 or 7.

Although in the preferred embodiment, described above, when the AC output current I is within a range between the current value Ip1 and the current value Ip2 in the second case, the target rotational speed N* is preferably set to the predetermined value N1, the present invention is not limited to the same. For example, the target rotational speed N* may be set so that the AC output current I decreases from the current value Ip2 to the current value Ip1 at a predetermined rate of change, as indicated by a thin one-dot-and-dash line in FIG. 5.

In this case, the absolute value of the slope of the target rotational speed N* when the AC output current I decreases from the current value Ip2 to the current value Ip1 can be set lower than the absolute value of the slope of the target rotational speed N* when the AC output current increases from the current value Ip1 to the current value Ip2. Thus, the difference between the target rotational speed N* and the resonance rotational speed is sufficiently ensured when the AC output current I approaches the current value Ip1. Thus, a period of time required for the engine 10 to rotate at the resonance rotational speed is reliably shortened.

Similarly, in the conversion table illustrated in FIG. 7 in the modified example, the target rotational speed N* may be set to decrease until the AC output current I decreases from the current value Ip5 to the current value Ip4. Alternatively, the target rotational speed N* may be set to decrease until the AC output current I decreases from the current value Ip3 to the current value Ip6.

In this case, the target rotational speeds N* may be set using the conversion table or the function when the AC output current I decreases from the current value Ip2 to the current value Ip1, when the AC output current I decreases from the current value Ip5 to the current value Ip4, and when the AC output current I decreases from the current value Ip3 to the current value Ip6.

In the preferred embodiment and the modified example thereof, as described above, it is preferably detected that the current AC output current Inew exceeds the current values Ip2, Ip5, and Ip3 in a decreasing direction by the determination processes in steps S14, S15, S31, S32, S34, and S35 illustrated in FIGS. 6 and 8. Instead, it may be detected that the current AC output current Inew exceeds the current values Ip2, Ip5, and Ip3 in a decreasing direction by respectively setting flags indicating that the current AC output current Inew exceeds the current values Ip2, Ip5, and Ip3 in an increasing direction (e.g., setting flags to "1") at the time point where the current AC output current Inew exceeds the current values Ip2, Ip5, and Ip3 in an increasing direction and detecting that the current AC output current Inew reaches the current values Ip2, Ip5, and Ip3 again on condition that the flags are set. In this case, each of the flags is reset (i.e., set to "0") at the time point where the current AC output current Inew exceeds the current values Ip2, Ip5, and Ip3 in a decreasing direction.

In the preferred embodiment and the modified example thereof, described above, the absolute values of the amounts of change when the target rotational speed N* changes to avoid the resonance rotational speed differ depending on whether the AC output current I (the rotational speed N of the engine 10) increases or decreases. When ease of the vibration of the engine 10 during the increase in the rotational speed N of the engine 10 or ease of the vibration of the engine 10 during the decrease in the rotational speed N of the engine 10 are not problems, however, the absolute value of the amount of change at the time of the increase in the rotational speed N of the engine 10 and the absolute value of the amount of change at the time of the decrease in the rotational speed N of the engine 10 may be the same.

In the preferred embodiment and the modified example thereof, described above, one three-phase winding 12a to output AC electric power is preferably provided. A plurality of three-phase windings driven by the engine 10 to output AC electric power may be provided within one electric generator. In this case, AC outputs of the plurality of three-phase windings may be respectively full-wave rectified while being smoothed, and a plurality of DC outputs thus obtained may be synthesized. One three-phase winding 12a or a plurality of three-phase windings for outputting AC electric power may be replaced with one single-phase winding or a plurality of single-phase windings.

Although in the preferred embodiment and the modified example thereof, described above, the full-wave rectifying circuit 20 and the smoothing circuit 30 are preferably used as a rectifying circuit for converting AC electric power into DC electric power, the configuration of the rectifying circuit is not limited to the configuration according to the above-described preferred embodiment. For example, the full-wave rectifying circuit 20 may be replaced with a half-wave rectifying circuit. When the rectifying circuit obtains substantially complete DC electric power, the smoothing circuit 30 need not be provided.

In the preferred embodiment and the modified example thereof, described above, the AC electric power is supplied to the external AC device (external load) preferably using one portable inverter power generation apparatus. Instead, another portable inverter power generation apparatus may be separately prepared, and output terminals thereof may be connected in parallel to the output terminals OUT1 and OUT2 of the portable inverter power generation apparatus according to the preferred embodiment or the modified example thereof described above. AC electric powers of the plurality of portable inverter power generation apparatuses are synthesized, and the synthesized AC electric powers are supplied to the external AC device. In this case, the phases of the AC electric powers from the plurality of portable inverter power generation apparatuses are matched by controlling the PWM controller 42 in the inverter circuit 40.

Although in the preferred embodiment and the modified example thereof, described above, the computer unit 60 and the opening adjuster 11 preferably control the rotational speed of the engine 10, the present invention is not limited to the same. Instead of the computer unit 60, a controller may be implemented by hardware such as an electronic circuit. Instead of adjusting the opening of the throttle valve by the opening adjuster 11, a fuel injection device may control a fuel injection amount or fuel injection timing to control the rotational speed of the engine 10.

Although in the preferred embodiment and the modified example thereof, described above, the portable inverter power generation apparatuses, the present invention is not limited to the same. For example, batteries may be respectively provided in place of the single-phase winding 12b, the full-wave rectifying circuit 71, the smoothing circuit 72, and the control power supply circuit 73.

Although in the preferred embodiment and the modified example thereof, described above, no battery is provided in the conversion characteristics illustrated in FIGS. 5 and 7 linearly change, the present invention is not limited to the same. The conversion characteristics may change in a curved shape.

Although in the conversion tables illustrated in FIGS. 5 and 7, the target rotational speed N* is kept at the predetermined value when the AC output current I is preferably in a range from zero to approximately 3.3 A, for example, the present invention is not limited to the same. The target rotational speed N* may increase as the AC output current I increases. Similarly, although the target rotational speed N* is kept at the predetermined value when the AC output current I exceeds approximately 15.5 A, the present invention is not limited to the same. The target rotational speed N* may increase as the AC output current I increases.

Although in the preferred embodiment and the modified example thereof, described above, the portable inverter power generation apparatus can preferably operate in the economy mode and the normal mode, the portable inverter power generation apparatus may operate in only the economy mode.

In the following two paragraphs, non-limiting examples of correspondences between various elements recited in the claims below and those described above with respect to various preferred embodiments of the present invention are explained.

In the preferred embodiments described above, the engine 10 is an example of an engine, the electric generator 12 is an example of an electric generator, the full-wave rectifying circuit 20 is an example of a rectifying circuit, the inverter circuit 40 is an example of an inverter circuit, the current sensor 82 is an example of a current detector, and the computer unit 60 and the opening adjuster 11 are examples of a controller. The computer unit 60 is an example of a processor, the opening adjuster 11 is an example of an engine rotational speed adjuster, the current values Ip1, Ip4, and Ip6 are examples of a first value, the current values Ip2, Ip3, and Ip5 are examples of a second value, the current value Ip3 is an example of a third value, the economy mode is an example of a first mode, and the normal mode is an example of a second mode.

As each of various elements recited in the claims, various other elements having configurations and functions described in the claims can also be used.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A portable inverter power generation apparatus comprising:
    an engine;
    an electric generator arranged to generate AC electric power by rotation of the engine;
    a rectifying circuit arranged to convert the AC electric power generated by the electric generator into DC electric power;
    an inverter circuit arranged to convert the DC electric power obtained by conversion performed by the rectifying circuit into AC electric power;
    a current detector arranged to detect an AC output current from the inverter circuit; and
    a controller arranged and programmed to set a target rotational speed of the engine in response to the AC output current detected by the current detector, and to control a rotational speed of the engine according to the set target rotational speed; wherein
    in a first case in which the AC output current detected by the current detector increases from a value lower than a first value to a value higher than the first value but lower than a second value, the controller sets the target rotational speed to a value lower than a resonance rotational speed at which the engine resonates until the AC output current detected by the current detector increases to the second value, and the controller sets the target rotational speed to a value higher than the resonance rotational speed when the detected AC output current increases to the second value;
    in a second case where the AC output current detected by the current detector decreases from a value higher than the second value to a value lower than the second value but higher than the first value, the controller sets the target rotational speed to a value higher than the resonance rotational speed until the AC output current detected by the current detector decreases to the first value, and sets the target rotational speed to a value lower than the resonance rotational speed when the detected AC output current decreases to the first value;
    the value higher than the first value but lower than the second value in the first case and the value lower than the second value but higher than the first value in the second case refer to any value between the first value and the second value;
    the value lower than the resonance rotational speed in the first case and the value lower than the resonance rotational speed in the second case refer to any value within a range of values lower than the resonance rotational speed; and the value higher than the resonance rotational speed in the first case and the value higher than the resonance rotational speed in the second case refer to any value within a range of values higher than the resonance rotational speed.

2. The portable inverter power generation apparatus according to claim 1, wherein, in the first case, the controller is programmed to increase the target rotational speed as the AC output current detected by the current detector increases between the first value and the second value.

3. The portable inverter power generation apparatus according to claim 2, wherein, in the second case, the controller is programmed to decrease the target rotational speed as the AC output current decreases between the second value and the first value, and the controller is programmed to decrease the target rotational speed in the second case at a rate that is less than a rate at which the controller is programmed to increase the target rotational speed in the first case.

4. The portable inverter power generation apparatus according to claim 2, wherein, in the second case, the controller is programmed to set the target rotational speed to a predetermined value higher than the resonance rotational speed as the AC output current decreases from the second value to the first value.

5. The portable inverter power generation apparatus according to claim 1, wherein an absolute value of an amount of change in the target rotational speed when the detected AC output current decreases to the first value in the second case is greater than an absolute value of an amount of change in the target rotational speed when the detected AC output current increases to the second value in the first case.

6. The portable inverter power generation apparatus according to claim 1, wherein the controller includes a processor arranged to set the target rotational speed in response to the AC output current detected by the current detector and an engine rotational speed adjuster configured to control the rotational speed of the engine according to the target rotational speed set by the processor.

7. The portable inverter power generation apparatus according to claim 6, wherein the processor is programmed to set the target rotational speed of the engine based on a previously stored relationship between the AC output current and the target rotational speed.

8. The portable inverter power generation apparatus according to claim 1, wherein the controller is selectively switchable to first and second modes, and in the first mode, the controller sets the target rotational speed to the value lower than the resonance rotational speed in the first case until the AC output current detected by the current detector increases to the second value, and sets the target rotational speed to the value higher than the resonance rotational speed in the first case when the detected AC output current increases to the second value, and the controller sets the target rotational speed to the value higher than the resonance rotational speed in the second case until the AC output current detected by the current detector decreases to the first value, and sets the target rotational speed to the value lower than the resonance rotational speed in the second case when the detected AC output current decreases to the first value, in the second mode, the controller sets the target rotational speed to a predetermined value higher than the resonance rotational speed when the AC output current detected by the current detector is not more than a third value higher than the second value, and the predetermined value higher than the resonance rotational speed may be equal to or higher than the value higher than the resonance rotational speed in the first case and the value higher than the resonance rotational speed in the second case.

9. The portable inverter power generation apparatus according to claim 1, wherein the engine is a single-cylinder four-cycle engine.

10. The portable inverter power generation apparatus according to claim 1, wherein the resonance rotational speed includes at least a first resonance rotational speed and a second resonance rotational speed higher than the first resonance rotational speed, and the resonance rotational speed in the first and second cases refers to the first resonance rotational speed;

in a third case in which the AC output current detected by the current detector increases from a value lower than a third value to a value higher than the third value but lower than a fourth value, the controller sets the target rotational speed to a value lower than the second resonance rotational speed until the AC output current detected by the current detector increases to the fourth value, and sets the target rotational speed to a value higher than the second resonance rotational speed when the detected AC output current increases to the fourth value;

in a fourth case where the AC output current detected by the current detector decreases from a value higher than the fourth value to a value lower than the fourth value but higher than the third value, the controller sets the target rotational speed to a value higher than the second resonance rotational speed until the AC output current detected by the current detector decreases to the third value, and sets the target rotational speed to a value lower than the second resonance rotational speed when the detected AC output current decreases to the third value;

the value higher than the third value but lower than the fourth value in the third case and the value lower than the fourth value but higher than the third value in the fourth case refer to any value between the third value and the fourth value;

the value lower than the second resonance rotational speed in the third case and the value lower than the second resonance rotational speed in the fourth case refer to any value within a range of values lower than the second resonance rotational speed;

the value higher than the second resonance rotational speed in the third case and the value higher than the second resonance rotational speed in the fourth case refer to any value within a range of values higher than the second resonance rotational speed; and the third value is higher than the first value.

* * * * *